(12) United States Patent
Shoenhair et al.

(10) Patent No.: US 12,096,832 B2
(45) Date of Patent: Sep. 24, 2024

(54) MULTI-WHEEL SYSTEM FOR LUGGAGE

(71) Applicant: KARSTEN MANUFACTURING CORPORATION, Phoenix, AZ (US)

(72) Inventors: Jordan D. Shoenhair, Scottsdale, AZ (US); Justin A. Paselk, Phoenix, AZ (US); John A. Solheim, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 353 days.

(21) Appl. No.: 17/445,568

(22) Filed: Aug. 20, 2021

(65) Prior Publication Data

US 2022/0053898 A1 Feb. 24, 2022

Related U.S. Application Data

(60) Provisional application No. 63/068,693, filed on Aug. 21, 2020.

(51) Int. Cl.
| | | |
|---|---|---|
| *A45C 5/14* | (2006.01) | |
| *A45C 5/03* | (2006.01) | |
| *B60B 19/00* | (2006.01) | |
| *B62B 1/12* | (2006.01) | |

(52) U.S. Cl.
CPC .............. *A45C 5/14* (2013.01); *A45C 5/03* (2013.01); *B60B 19/00* (2013.01); *B62B 1/12* (2013.01); *B60B 2200/45* (2013.01); *B60B 2900/351* (2013.01); *B60B 2900/551* (2013.01)

(58) Field of Classification Search
CPC ....... A45C 5/14; A45C 5/03; A45C 2005/148; B60B 19/00; B60B 2200/45; B60B 2900/351; B60B 2900/551; B60B 2900/721; B60B 19/12; B62B 1/12; B62B 5/026; B62B 1/10
See application file for complete search history.

(56) References Cited

U.S. PATENT DOCUMENTS

| | | | |
|---|---|---|---|
| 4,062,557 A | 12/1977 | Roden | |
| 4,337,961 A | 7/1982 | Covert et al. | |
| 4,817,974 A | 4/1989 | Bergeron | |
| 5,947,495 A | 9/1999 | Null et al. | |
| 6,158,753 A | 12/2000 | Sturbaum | |
| 6,431,568 B1 | 8/2002 | McCleese | |

(Continued)

FOREIGN PATENT DOCUMENTS

| | | | |
|---|---|---|---|
| ES | 2320189 A1 | 5/2009 | |
| FR | 2766382 A1 | 1/1999 | |

(Continued)

OTHER PUBLICATIONS

PCT International Search Report and Written Opinion dated Jun. 22, 2020 from corresponding PCT Application No. PCT/US2020/024164.

(Continued)

*Primary Examiner* — James A Shriver, II
*Assistant Examiner* — Michael T. Walsh

(57) ABSTRACT

A multi-wheel system that minimizes wheel interactions with discontinuous and uneven surfaces. The multi-wheel system comprises wheels of varying diameters connecting to a rotating arm configured to raise and lower the wheels in response to obstacles along the rolling surface.

20 Claims, 13 Drawing Sheets

(56) References Cited

U.S. PATENT DOCUMENTS

| | | |
|---|---|---|
| 7,581,739 B2 | 9/2009 | Fraley |
| 8,246,058 B2 | 8/2012 | Wang et al. |
| 8,328,206 B2 | 12/2012 | Williams, Jr. |
| 8,500,137 B2 * | 8/2013 | Ardestany ............. A63C 17/20 |
| | | 280/11.221 |
| 8,608,185 B2 | 12/2013 | Bermal |
| 8,807,577 B2 | 8/2014 | Lai |
| 9,492,731 B2 | 11/2016 | Marusiak et al. |
| 9,573,045 B2 * | 2/2017 | Lai ....................... A63C 17/014 |
| 9,604,124 B2 | 3/2017 | Aders |
| 9,821,215 B2 | 11/2017 | Ivazes |
| 10,322,332 B2 | 6/2019 | Strand |
| 10,335,667 B2 | 7/2019 | Martinez Almansa et al. |
| 10,455,913 B1 * | 10/2019 | Tan ......................... A45C 5/14 |
| 10,967,244 B2 | 4/2021 | Lininger, Jr. |
| 11,684,842 B2 * | 6/2023 | Cappello ............ A63C 17/0073 |
| | | 280/87.042 |
| 2003/0141688 A1 | 7/2003 | Lynn |
| 2006/0006622 A1 | 1/2006 | Gesmer et al. |
| 2010/0090423 A1 * | 4/2010 | Farrelly ................. A63C 17/01 |
| | | 280/841 |
| 2011/0023268 A1 * | 2/2011 | Smith ................ B60B 33/0018 |
| | | 16/47 |
| 2012/0223492 A1 | 9/2012 | Ackerman |
| 2013/0001903 A1 * | 1/2013 | Ardestany ............. A63C 17/20 |
| | | 280/11.221 |
| 2013/0181417 A1 | 7/2013 | Smith |

FOREIGN PATENT DOCUMENTS

| | | |
|---|---|---|
| FR | 2810894 A1 | 1/2002 |
| KR | 20050060368 A | 6/2005 |
| KR | 200390293 Y1 | 7/2005 |
| RU | 180804 U1 * | 6/2018 |
| WO | 1997028863 | 8/1997 |
| WO | 1998005390 | 2/1998 |
| WO | 2002020100 A1 | 3/2002 |
| WO | 2003033089 | 4/2003 |
| WO | 2006061528 A2 | 6/2006 |
| WO | 2014133485 A1 | 9/2014 |
| WO | 2015066749 A1 | 5/2015 |
| WO | WO-2020198114 A1 * | 10/2020 ......... A63C 17/0046 |

OTHER PUBLICATIONS

PCT International Search Report and Written Opinion dated Dec. 6, 2021 from corresponding PCT Application No. PCT/US2021/046974.

* cited by examiner

MULTI-WHEEL SYSTEM FOR LUGGAGE

RELATED APPLICATION DATA

This claims the benefit of U.S. Provisional Patent Application No. 63/068,693, filed on Aug. 21, 2020, the contents of all of which are entirely incorporated herein by reference.

TECHNICAL FIELD

This disclosure relates generally to luggage and more particularly to a multi-wheel system for a piece of luggage.

BACKGROUND

Individuals use luggage to transport their belongings easily and efficiently when they travel. Many people prefer to use luggage with some sort of wheel system on the bottom, which allows the user to roll the luggage across the ground. During use, the luggage may encounter obstacles including bumps, cracks, or discontinuities in the rolling surface. Upon impact between the luggage wheels and such obstacles, the obstacle can impart undesirable forces on the wheel system. Further, the ground may even stop the user in their tracks as the luggage "sticks" in the obstruction. The force of impact between the luggage wheels and the obstacle can result in unwanted effects such as shock, noise, damage to the wheels, rolling of the luggage that causes the luggage to topple over, and potential damage to the wrist of the user pulling the luggage. Therefore, there is a need in the art for a wheel system that allows for smooth passage of a piece of luggage over cracks or uneven surfaces to enhance an individual's travel experience.

BRIEF DESCRIPTION OF THE DRAWINGS

This disclosure relates generally to luggage and more particularly to a multi-wheel system for a piece of luggage and related methods.

Figure 1:
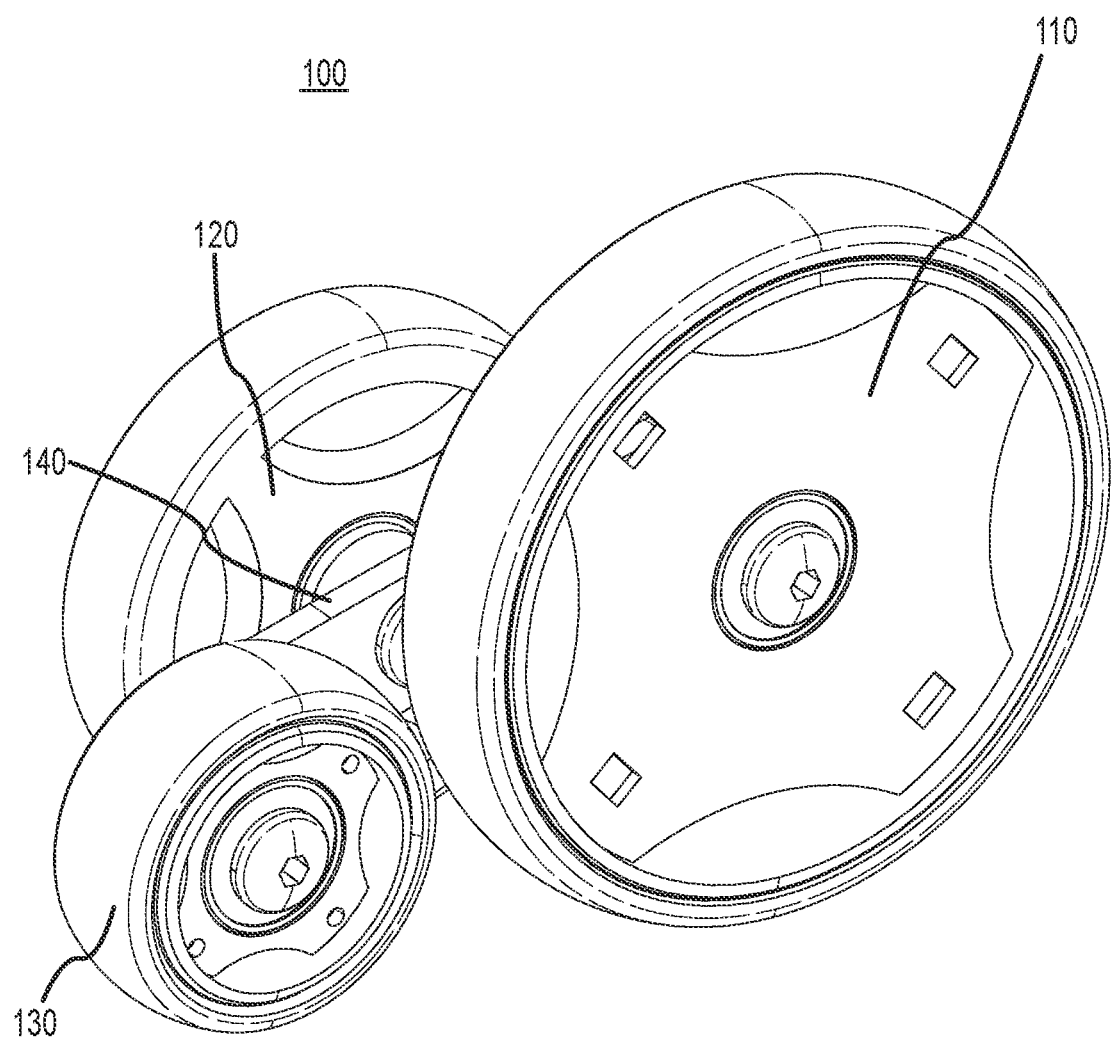
FIG. 1 illustrates a perspective view of a multi-wheel system with a central axle.

Other aspects of the disclosure will become apparent by consideration of the detailed description and accompanying drawings.

DESCRIPTION

Described herein is a wheel system configured to smoothly pass over obstacles and uneven surfaces. The wheel system comprises a plurality of wheels of different diameters coupled to a rotating arm that allows a leading wheel and a trailing wheel to pivot about a central axle in response to impact with obstacles. The wheel system absorbs shock and minimizes wheel interactions with obstacles. Utilizing multiple wheels with different diameters and a rotatable central axle provides the wheel system with a smooth-rolling benefit in a compact design.

The terms "first," "second," "third," and "fourth," used herein distinguishes between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "front," "back," "top," "bottom," "above," and "below," used herein are for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The term or phrase "luggage" or "bag" used herein can be defined as a body configured to hold clothing or personal items for transport. The luggage body can be defined by one or more panels that comprise a general shape, such as, but not limited to, a rectangular prism. The panels can be either hard shell panels that retain a rigid shape or soft-shell panels that are flexible and foldable. The interior of the luggage can be defined by an interior cavity formed by the panels. The interior of the bag may be accessible by a removable attachment along one or more of the edges or surfaces of the panels. The removable attachment may comprise a zipper, buttons, snaps, or any other means suitable of opening and closing the luggage. The luggage may be defined such that when the bag is in use, a top of the luggage is defined as facing upward, a bottom of the luggage is defined as facing downward, a front of the luggage is defined as facing the direction in which the bag is being transported, and a back of the luggage is defined as facing opposite the direction in which the bag is being transported.

The term or phrase "focus" used herein can be defined as the center point of a wheel. The focus of each wheel can be located at the center of the wheel's diameter or at the wheel's center of gravity. The focus of the wheel can be used to describe the location of the wheel in relation to other components of the moving wheel system.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

1. OVERALL WHEEL SYSTEM

Figure 2:
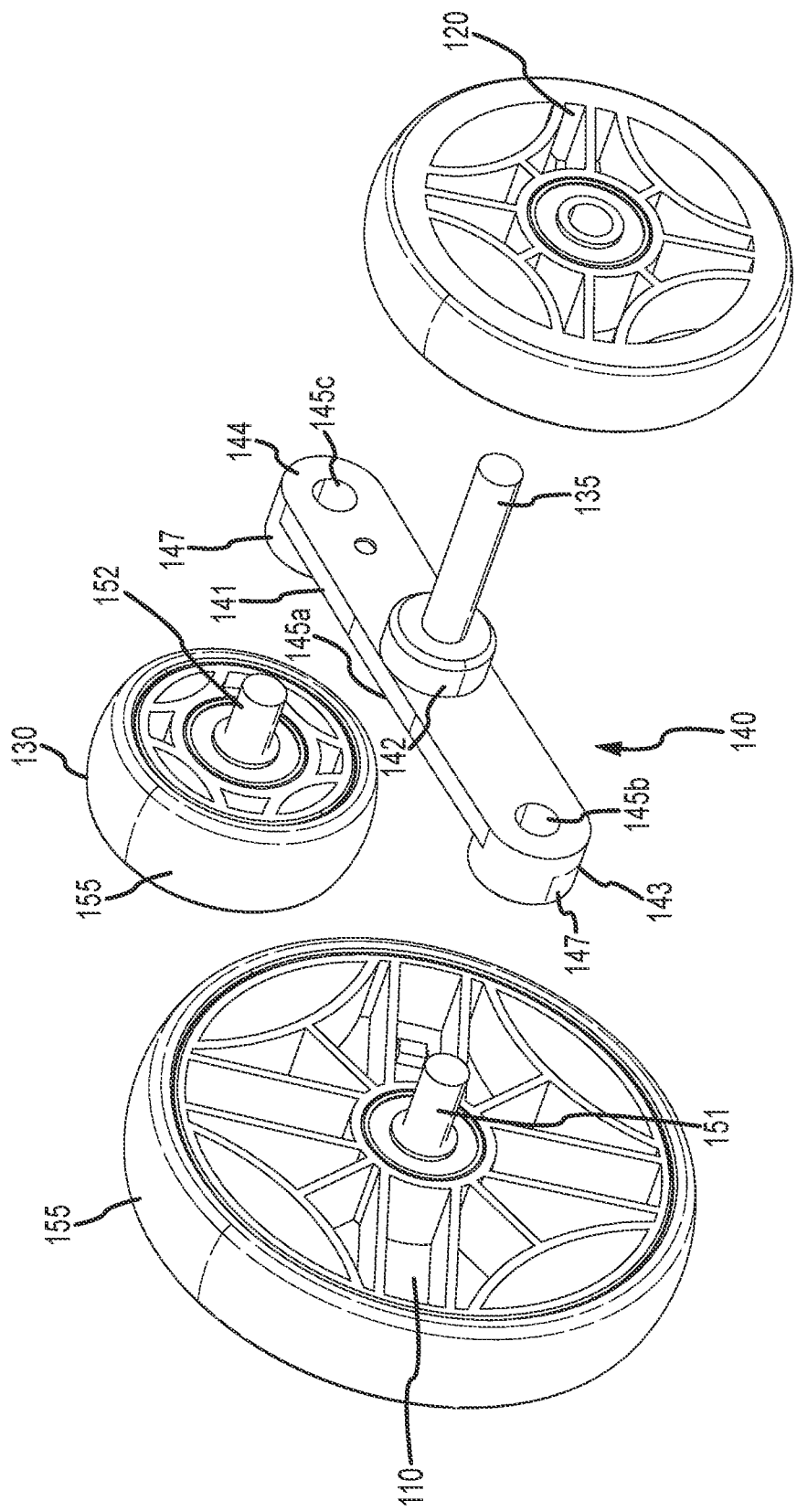
FIG. 2 illustrates an exploded view of the multi-wheel system with a central axle of FIG. 1.

The wheel system 100 possesses the ability to smoothly traverse obstacles encountered during use, such as cracks or bumps in the ground. The wheel system comprises three wheels of varying diameters that allows at least one wheel to engage with the ground or obstacles at any given point in time. FIGS. 1 and 2 illustrate the wheel system according to the present embodiment. The wheel system 100 comprises a rotating arm 140 rotatably coupled to a central axle 135 and a plurality of wheels of various diameters coupled to the rotating arm 140 by a plurality of axles. The plurality of wheels comprises a leading wheel 110 having a first diameter D1 coupled to a leading end 143 of the arm, a central wheel 120 near the center 142 of the rotating arm 140, and a trailing wheel 130 coupled at a trailing end 144 of the rotating arm 140. As the rotating arm 140 rotates about the central axle 135 during use, the leading wheel 110 and the trailing wheel 130, which are attached at opposing ends 143, 144 of the arm 140 by a leading axle 151 and a trailing axle 152, respectively, pivot about the central axle 135, raising or lowering in response to obstacles or a discontinuous rolling surface.

a. Rotating Arm

Figure 3:
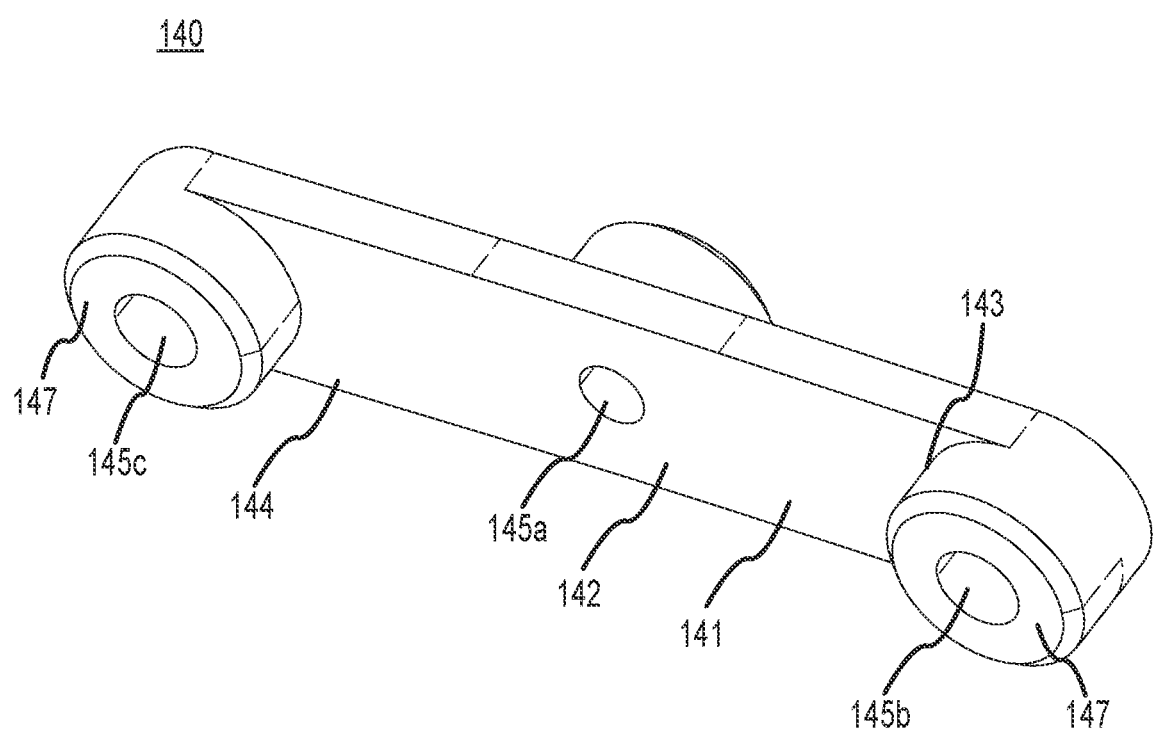
FIG. 3 illustrates a perspective view of the rotating arm.

As discussed above, the plurality of wheels are coupled to the rotating arm 140 by a plurality of axles. The rotating arm 140 coordinates the plurality of wheels in a configuration that allows the leading wheel 110 and trailing wheel 130 to raise or lower as the arm 140 rotates in response to obstacles O, all while the central wheel 120 rotates in place on the central axle 135. Referring to FIG. 3, the rotating arm 140 generally comprises a body 141 that is long, flat, and straight. The rotating arm 140 comprises a plurality of apertures 145a, 145b, 145c located along its length configured receive the various axles and couple the wheels to the rotating arm 140. The attachment location of each axle provides the wheel system 100 with the necessary smooth-rolling function. As illustrated in FIG. 2, the central wheel 120 is coupled to the rotating arm 140 by the central axle 135, such that the central wheel 120 and the rotating arm 140 both rotate about the central axle 135. Due to this configuration, even as the rotating arm 140 rotates, the central wheel 120 does not pivot about the central axle 135, but instead remains rotatably affixed about the central axle 135. The central axle 135 can be received by a central aperture 145a located near the middle of the rotating arm 140. The leading wheel 110 and the trailing wheel 130 are coupled at opposing ends of the rotating arm 140 by a leading axle 151 and a trailing axle 152, respectively. The leading axle 151 is received by a front aperture 145b in the rotating arm 140 located near a leading end 143 of the arm, while the trailing axle 152 is received by a rear aperture 145c in the rotating arm 140 located near a trailing end 144 of the arm. The leading and trailing axles provide axes for the leading and trailing wheels to rotate on and further allow the leading and trailing wheels to pivot about the central axle 135 as the arm rotates. The leading and trailing axles 151, 152 couple the leading and trailing wheels 110, 130 to opposing ends of the rotating arm 140, which allows the leading and trailing wheels 110, 130 to be raised or lowered as the arm 140 rotates in response to obstacles O along the ground.

b. Central Axle

The central axle 135 serves as the primary attachment point and primary rotation point of the entire luggage system 300. The central axle 135 acts as the primary attachment point by connecting the wheel system 100 to a piece of luggage 300 or other apparatus. The central axle 135 extends from the luggage 300 through the central wheel 120 and rotating arm 140. The central axle 135 acts as the primary rotation point by allowing the central wheel 120 and rotating arm 140 to rotate about the same axle. Since the central wheel 120 and rotating arm 140 are attached to the central axle 135, which is connected to the luggage 300, the central axle 135 will transfer the weight of the luggage 300 to the central wheel 120 and/or rotating arm 140 (depending on the configuration). When the central wheel 120 is in contact with ground, the central axle 135 will transfer the majority of the weight to the central wheel 120, and some or none of the weight to the rotating arm 140. When the central wheel 120 is not in contact with the ground, the central axle 135 will transfer all the weight to the rotating arm 140, and none to the central wheel 120. In turn, the rotating arm 140 will further transfer the weight to the leading and trailing axles 151, 152.

c. Leading and Trailing Axles

The leading and trailing axles 151, 152 serve as a means of coupling the leading wheel 110 and the trailing wheel 130 to opposite ends of the rotating arm 140. The leading and trailing axles 151, 152 attach only to the rotating arm 140, and do not serve as attachment points between the wheel system 100 and the luggage 300 or other apparatus. Thus, the leading and trailing axles 151, 152 are free to pivot about the central axle 135, independent of the movement of the luggage. The leading and trailing wheels 110, 130 are configured to freely rotate upon the leading and trailing axles 151, 152, respectively.

As the leading wheel 110 encounters an obstacle O, it will raise or lower to overcome that obstacle O in response. Because the leading wheel 110 is connected to the rotating arm 140 via the leading axle 151, this in turn raises or lowers the leading end 143 of the rotating arm 140 as well. This causes the rotating arm 140 to move in a "seesaw" motion, resulting in the trailing end 144 of the rotating arm 140 to raise or lower in the opposite direction of the leading end 143. Further, this causes the trailing wheel 130 connected via the trailing axle 152 to raise or lower opposite the leading wheel 110. For example, as the leading wheel 110 lowers in response to an obstacle O, the trailing end 144 will "seesaw" and the trailing wheel 130 will raise. Conversely, if the leading wheel 110 raises in response to an obstacle O, the trailing end 144 will "seesaw" and the trailing wheel 130 will lower. If the wheel system 100 encounters an obstacle O, the leading wheel 110 and trailing wheel 130 can suspend the central wheel 120 via their axle connections to the rotating arm 140.

As discussed above, the central axle 135 bears the load of the luggage 300 or other apparatus. When the central wheel 120 is in contact with the ground, the central wheel 135 can support most or all the load on the central axle 135. In other configurations in which the central wheel 135 is not in contact with the ground, such as when the central wheel 135 is suspended above a crack by the rotating arm 140, the rotating arm 140 can bear the load of the central axle 135. In such configurations, the leading and trailing wheels 110, 130 can support the rotating arm 140 due to their attachment on either end of the rotating arm 140 via the leading and trailing axles 151, 152. This configuration allows the load of the central axle 135 to be transferred through the rotating arm 140 and dispersed between the leading and trailing axles 110, 130.

d. Wheel System Applications

The wheel system 100 described above, or any variations thereof, can be used in a variety of applications. In some embodiments, the wheel system 100 can be used in wheelbarrows, industrial carts, industrial dollies, commercial carts, commercial dollies, hand trucks, stack trucks, skateboard trucks, longboard trucks, and/or luggage. Alternatively, the apparatus, methods, and articles of manufactures described herein may be applicable to any other type of application that requires a wheel system to smoothly pass over uneven surfaces or foreign objects. In many preferred embodiments, the wheel system 100 can be applied to the body of a piece of luggage.

2. WHEEL RELATIONSHIPS a. Wheel Diameter Relationships

Figure 4:
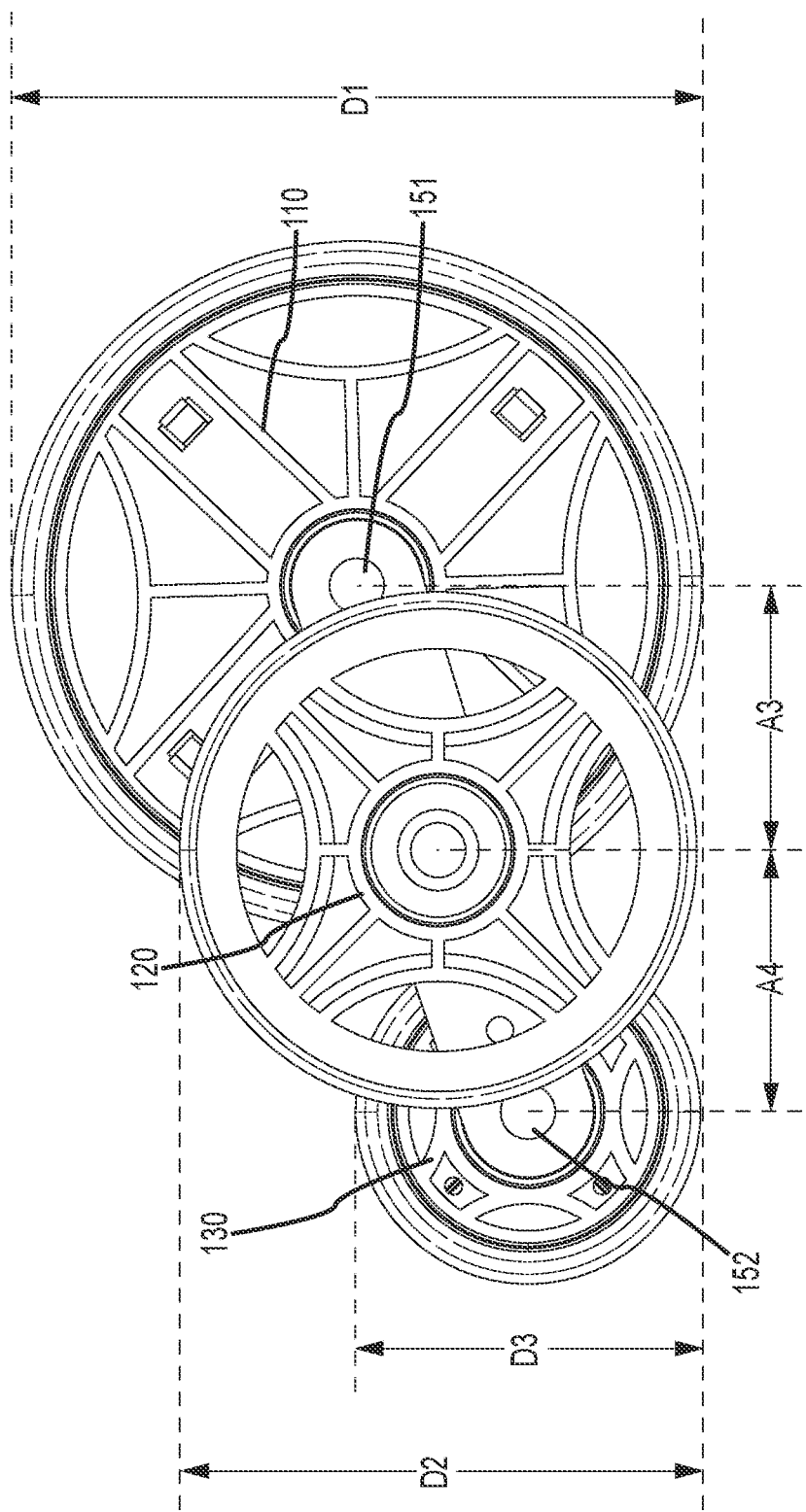
FIG. 4 illustrates a side view of the multi-wheel system of FIG. 1

The specific relationship between the size and location of the wheels provides the wheel system 100 with the ability to smoothly traverse obstacles O. As illustrated in FIG. 4, the leading wheel 110, the central wheel 120, and the trailing wheel 130 are all different sizes. As such, the leading wheel 110 comprises a first diameter D1, the central wheel 120 comprises a second diameter D2 distinct from the first diameter D1, and the trailing wheel 130 comprises a third diameter D3 distinct from the first D1 and second D2 diameters. The diameter of the respective wheels decreases from the leading end 143 of the arm to the trailing end 144 of the arm. The first diameter D1 of the leading wheel 110 is greater than the second diameter D2 of the central wheel 120 and the second diameter D2 of the central wheel 120 is greater than the third diameter D3 of the trailing wheel 130.

The wheel system 100 comprises both a large leading wheel diameter D1 that allows the system 100 to easily traverse obstacles. The wheel system 100 further comprises progressively smaller central and trailing wheel diameters D2, D3 that allow the wheel system 100 to be more compact than would a similar multi-wheel system wherein the central and trailing wheels are the same size as the leading wheel. In general, when first encountering an obstacle, wheels with larger diameters traverse such obstacles much more easily than wheels with smaller diameters. For obstacles that protrude upward from the ground, such as bumps, the impact between the bump and a small diameter wheel occurs at a point relatively high on the wheel, closer to the wheel's center of gravity. This type of impact results in a significant force acting in a direction opposite the momentum of the wheel. Conversely, the impact between a bump and a large diameter wheel occurs relatively low on the wheel, further away from the wheel's center of gravity. The force acting against the wheel's momentum in this type of impact is minimized. Similarly, for obstacles recessed into the ground, such as cracks, a small diameter wheel will fall further into the crack than a larger diameter wheel. This causes an impact between the edge of the crack that occurs relatively high and close to the center of gravity for a small diameter wheel, causing significant loss of momentum. Conversely, an impact between the edge of the crack and a large diameter wheel would occur relatively low and far away from wheel's center of gravity, causing a negligent loss of momentum.

For this reason, the leading wheel 110 is provided with the largest diameter, as the leading wheel 110 is the first wheel in the system 100 to encounter obstacles during normal use. The central 120 and trailing wheel 130, which do not interact as directly with obstacles, do not necessitate such large diameters. As discussed above, it is desirable for the central 120 and trailing wheels 130 to have progressively smaller diameters in order to create a compact wheel system. The compact wheel arrangement described herein, inherently comprises less weight and takes up less space on a piece of luggage than a similar multi-wheel system without wheels having decreasing diameters.

Figure 5:
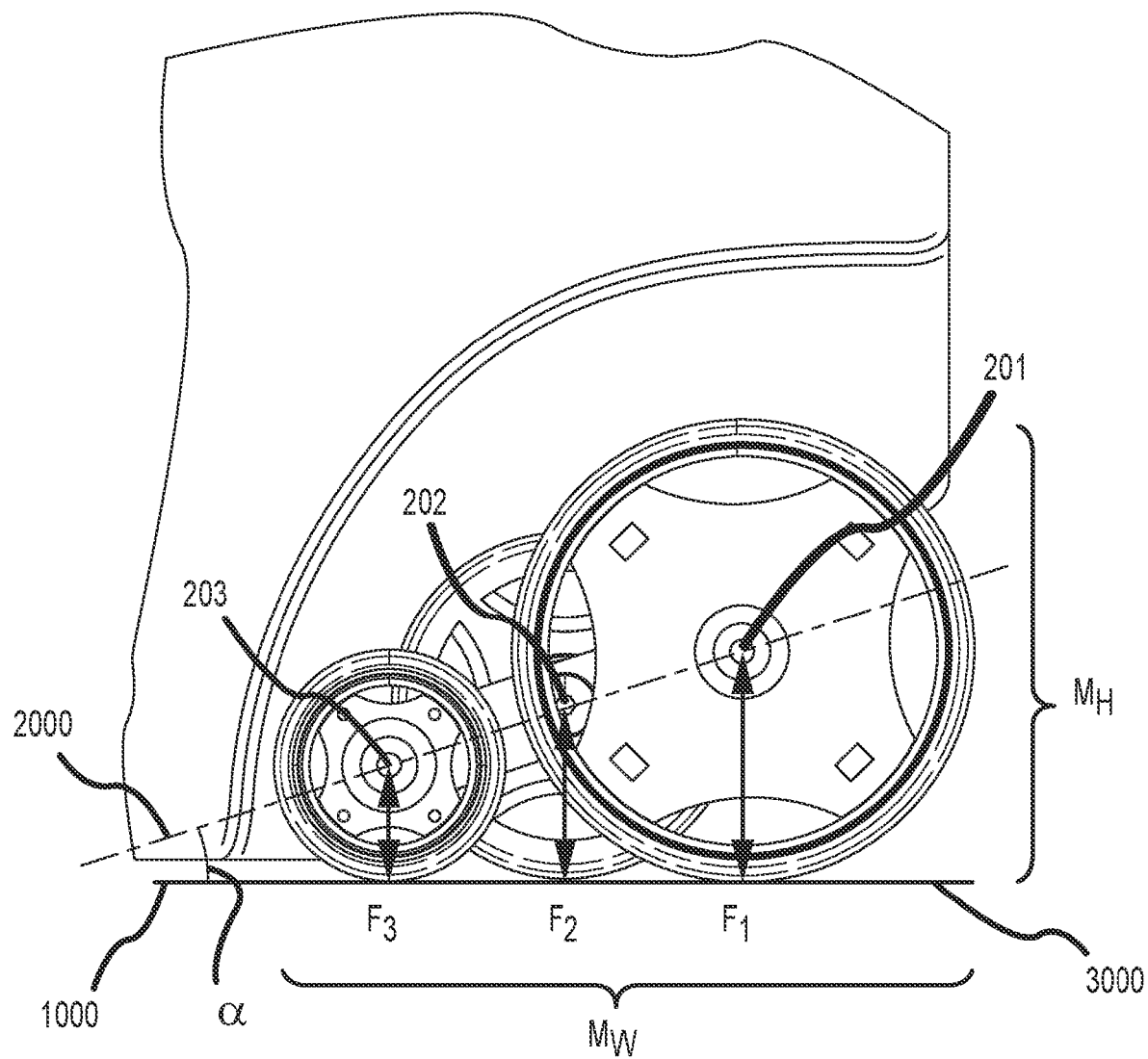
FIG. 5 illustrates a side view of the multi-wheel system of FIG. 1 in connection with the ground plane.
Figure 6A:
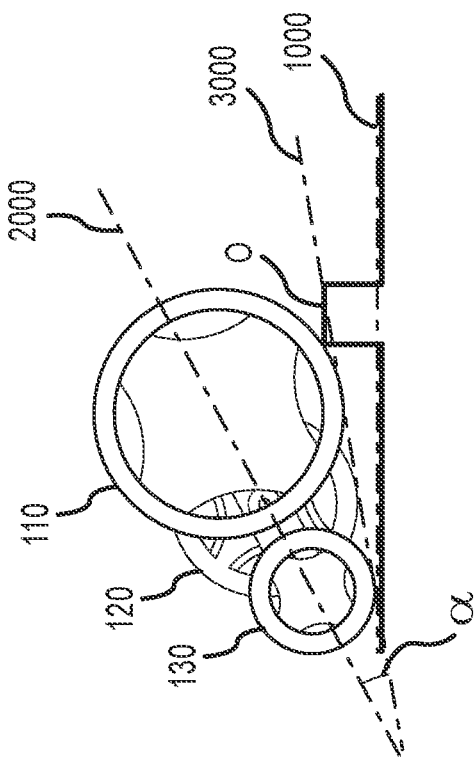
FIGS. 6A-6D illustrate a side view of the multi-wheel system of FIG. 1 overcoming an obstacle above the ground plane.
Figure 6B:
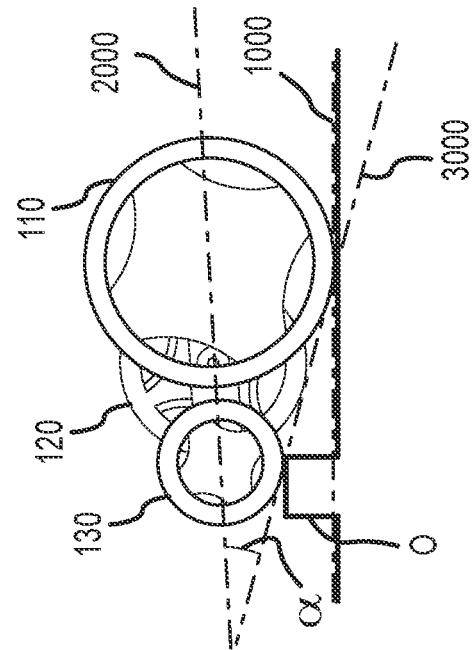
Figure 6C:
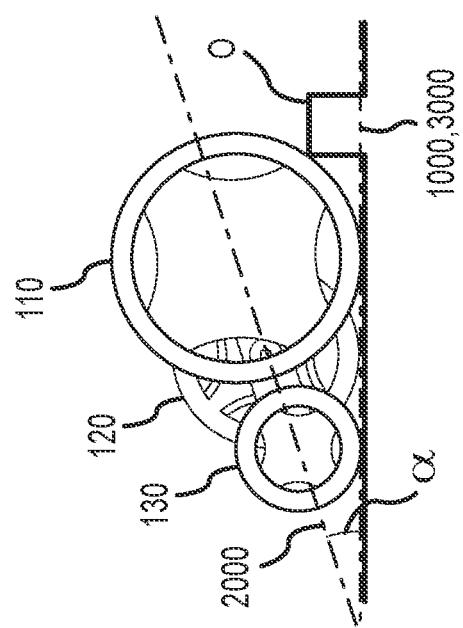
Figure 6D:
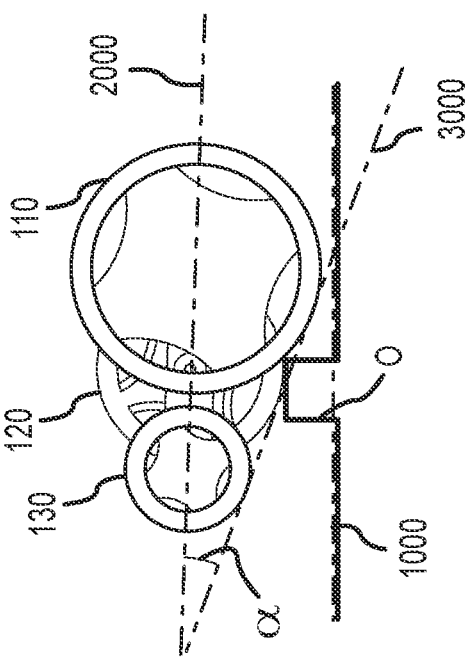
Figure 7A:
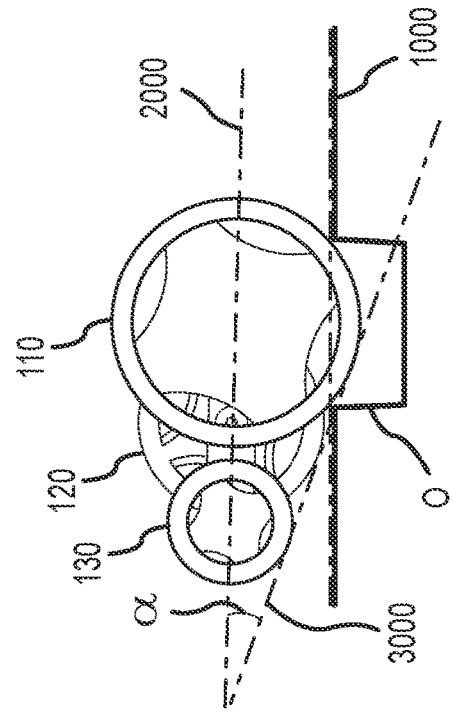
FIGS. 7A-7D illustrate a side view of the multi-wheel system of FIG. 1 overcoming an obstacle below the ground plane.
Figure 7B:
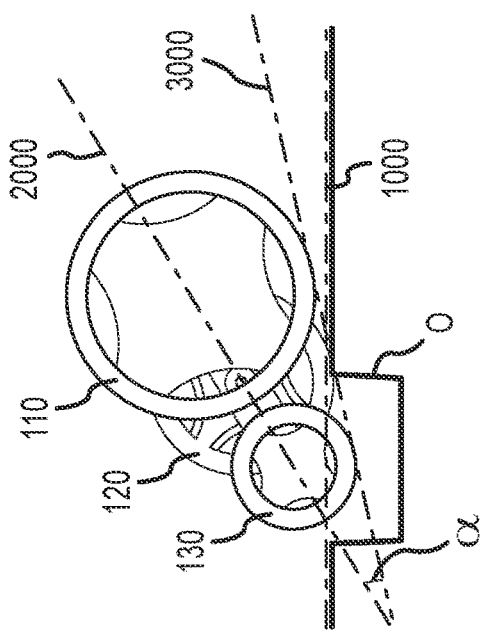
Figure 7C:
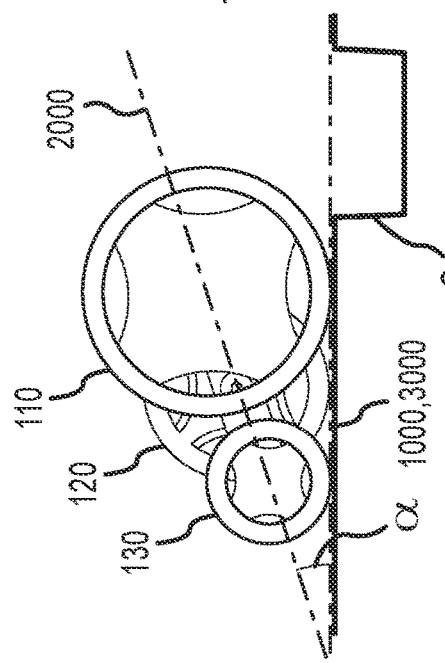
Figure 7D:
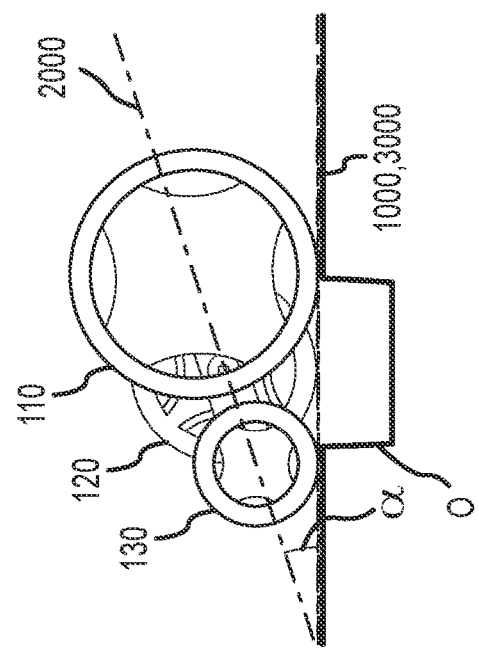

The wheel system 100 is configured so that at least one wheel is in contact with the ground or obstacle at any given time. Referring to FIG. 5, the bottom of all three wheels rest on a common plane, denoted as contact plane 3000. The contact plane 3000 is defined as a horizontal plane tangent to each of the leading wheel 110, the central wheel 120, and the trailing wheel 130. The bottom of each wheel resting on the same contact plane 3000 allows all three wheels to contact the ground simultaneously during normal rolling conditions over a smooth surface. As illustrated in FIG. 5, the surface upon which the system rolls can define a ground plane 1000. Under normal rolling conditions, the contact plane 3000 is coincident with the ground plane 1000.

b. Wheel Focus

The size and positioning of the wheels within the wheel system 100 can further be characterized by the location of each wheel's center. As illustrated in FIG. 5, each wheel comprises a geometric center point (hereafter referred to the "focus" of each wheel). The leading wheel 110 comprises a first focus 201 defining the leading wheel's geometric center point, the central wheel 120 comprises a second focus 202 defining the central wheel's geometric center point, and the trailing wheel 130 comprises a third focus 203 defining the trailing wheel's geometric center point. The first focus 201, the second focus 202, and the third focus 203 all lie along the same plane, illustrated in FIG. 5 as reference plane 2000. In many embodiments, the reference plane 2000 extends through the length of the rotating arm 140, from the leading end 143 to the trailing end 144. By each focus 201, 202, 203 being bound to the same reference plane 2000, the orientation of the reference plane determines the possible relationships between the location and size of each wheel.

As illustrated in FIG. 5, the wheel system 100 comprises an acute angle α between the reference plane 2000 and the contact plane 3000 that is consistent no matter the configuration of the rotating arm 140. As such, the height of the reference plane 2000 with respect to the contact plane is greater at points near the leading end 143 than at points near the trailing end 144. The greater the angle α, the more severely the height of the reference plane 2000 increases from the trailing end 144 to the leading end 143. In many embodiments the angle α between the contact plane 3000 and the reference plane 2000 can range from between 10 degrees to 60 degrees. In some embodiments, the angle α between the contact plane 3000 and the reference plane 2000 can be between 10 degrees and 20 degrees, between 20 degrees and 30 degrees, between 30 degrees and 40 degrees, between 40 degrees and 50 degrees, or between 50 degrees and 60 degrees. In other embodiments, the angle α between the contact plane 3000 and the reference plane 2000 can be between 10 degrees and 30 degrees, between 15 degrees and 35 degrees, between 20 degrees and 40 degrees, between 25 degrees and 45 degrees, between 30 degrees and 50 degrees, between 35 degrees and 55 degrees, or between 40 degrees and 60 degrees. For example, the angle α between the contact plane 3000 and the reference plane 2000 can be 20 degrees, 21 degrees, 22 degrees, 23 degrees, 24 degrees, 25 degrees, 26 degrees, 27 degrees, 28 degrees, 29 degrees, 30 degrees, 31 degrees, 32 degrees, 33 degrees, 34 degrees, 35 degrees, 36 degrees, 37 degrees, 38 degrees, 39 degrees, or 40 degrees.

Referring to FIG. 5, the location of each focus along the reference plane 2000 is related to the attachment location between the axle corresponding to each wheel and the rotating arm 140. In embodiments wherein the leading axle 151 is coupled to the rotating arm 140 at a location substantially close to the leading end 143, the location of the first focus 201 in a leading-end-to-trailing-end direction of the reference plane 2000 is also substantially close to the leading end 143. Conversely, in embodiments wherein the leading axle 151 is coupled to the rotating arm 140 at a location further from the leading end 143, the location of the first focus 201 in a leading-end-to-trailing-end direction of the reference plane 2000 can be further from the leading end 143. Altering the location of each focus along the reference plane 2000 can alter the height of each focus, and thus alter the necessary diameter for each wheel. For example, the closer to the leading end 143 of the angled reference plane 2000 each focus is, the higher the focus must be and the greater the diameter of the corresponding wheel.

The leading wheel 110, the central wheel 120, and the trailing wheel 130 each further define a focus height. The leading wheel 110 comprises a first focus height F1 measured as the perpendicular distance between the contact plane 3000 and the first focus 201. The central wheel 120 comprises a second focus height F2 measured as the perpendicular distance between the contact plane 3000 and the second focus 202. The trailing wheel 130 comprises a third focus height F3 measured as the perpendicular distance between the contact plane 3000 and the third focus 203. As illustrated in FIG. 5, the first focus height F1 is greater than the second focus height F2, and the second focus height F2 is greater than the third focus height F3.

The focus height of each wheel is linearly dependent on the location of each wheel's focus in a leading-end-to-trailing-end direction. This is due to the fact that the bottom of each wheel coincides with the contact plane 3000 while the focus of each wheel is located on a reference plane 2000, which is at a consistent angle α with the contact plane 3000. As illustrated by FIG. 5, the closer the first focus 201 is located with respect to the leading end 143, the greater the first focus height F1 must be for the bottom of the leading wheel 110 to remain coincident with the contact plane 3000. Similarly, the further the first focus 201 is located from the leading end 143, the lower the first focus height F1 must be. For the same reasons, the closer the third focus 203 is to the trailing end 144; the third focus height F3 must be lower; and the further the third focus 203 is from the trailing end 144, the third focus height F3 must be greater. In many embodiments, the second focus 202 of the central wheel 120 is located substantially equidistant between the leading end 143 and the trailing end 144. However, in some embodiments, the second focus 202 can be located closer to the leading end 143 or closer to the trailing end 144. When located closer to the leading end 143, the second focus height F2 is greater than when located closer to the trailing end 144.

In many embodiments, the first focus height F1 can range from between 1.5 inches and 3.0 inches. In some embodiments, the first focus height F1 is between 1.5 inches and 1.75 inches, between 1.75 inches and 2.0 inches, between 2.0 inches and 2.25 inches, between 2.25 inches and 2.5 inches, between 2.5 inches and 2.75 inches, or between 2.75 inches and 3.0 inches. In other embodiments, the first focus height F1 is between 1.5 inches and 2.0 inches, between 1.75 inches and 2.25 inches, between 2.0 inches and 2.5 inches, between 2.25 inches and 2.75 inches, or between 2.5 inches and 3.0 inches. For example, the first focus height F1 can be 1.5 inches, 1.55 inches, 1.60 inches, 1.65 inches, 1.70 inches, 1.75 inches, 1.80 inches, 1.85 inches, 1.90 inches, 1.95 inches, 2.0 inches, 2.05 inches, 2.10 inches, 2.15 inches, 2.20 inches, 2.25 inches, 2.30 inches, 2.35 inches, 2.40 inches, 2.45 inches, 2.50 inches, 2.55 inches, 2.60 inches, 2.65 inches, 2.70 inches, 2.75 inches, 2.80 inches, 2.85 inches, 2.90 inches, 2.95 inches, or 3.0 inches.

In many embodiments, the second focus height F2 can range from between 0.75 inches and 2.0 inches. In some embodiments, the second focus height F2 is between 0.75 inches and 1.0 inches, between 1.0 inches and 1.25 inches, between 1.25 inches and 1.5 inches, between 1.5 inches and 1.75 inches, or between 1.75 inches and 2.0 inches. In other embodiments, the second focus height F2 is between 0.75 inches and 1.25 inches, between 1.0 inches and 1.5 inches, between 1.25 inches and 1.75 inches, or between 1.5 inches and 2.0 inches. For example, the second focus height F2 can be 0.75 inches, 0.80 inches, 0.85 inches, 0.90 inches, 0.95 inches, 1.0 inches, 1.05 inches, 1.10 inches, 1.15 inches, 1.20 inches, 1.25 inches, 1.30 inches, 1.35 inches, 1.40 inches, 1.45 inches, 1.50 inches, 1.55 inches, 1.60 inches, 1.65 inches, 1.70 inches, 1.75 inches, 1.80 inches, 1.85 inches, 1.90 inches, 1.95 inches, or 2.0 inches.

In many embodiments, the third focus height F3 can range from between 0.25 inches and 1.5 inches. In some embodiments, the third focus height F3 is between 0.25 inches and 0.5 inches, between 0.5 inches and 0.75 inches, between 0.75 inches and 1.0 inches, between 1.0 inches and 1.25 inches, or between 1.25 inches and 1.5 inches. In other embodiments, the third focus height F3 is between 0.25 inches and 0.75 inches, between 0.5 inches and 1.0 inches, between 0.75 inches and 1.25 inches, or between 1.0 inches and 1.5 inches. For example, the third focus F3 height can be 0.25 inches, 0.30 inches, 0.35 inches, 0.40 inches, 0.45 inches, 0.50 inches, 0.55 inches, 0.60 inches, 0.65 inches, 0.70 inches, 0.75 inches, 0.80 inches, 0.85 inches, 0.90 inches, 0.95 inches, 1.0 inches, 1.05 inches, 1.10 inches, 1.15 inches, 1.20 inches, 1.25 inches, 1.30 inches, 1.35 inches, 1.40 inches, 1.45 inches, or 1.5 inches.

Although the ranges described in relation to the first focus height F1, the second focus height F2, and the third focus height F3 overlap, it should be noted that the first focus height F1, the second focus height F2, and the third focus height F3 are each distinct. The first focus height F1 is always greater than the second focus height F2 and the second focus height F2 is always greater than the third focus height F3 in any particular embodiment. In no embodiment do any of the first focus height F1, the second focus height F2, and/or the third focus height F3 comprise the same values.

3. CONFIGURATIONS OF THE WHEEL SYSTEM OVER OBSTACLES

As shown in FIGS. 6-7, the design of the wheel system 100 allows the luggage to be rolled smoothly over obstacles or uneven surfaces. Obstacles O are features that extend either above and/or below the ground plane 1000. For example, obstacles O that extend above the ground plane 1000 can be bumps or protuberances while obstacles O that extend below the ground plane 1000 can be cracks, slit, or crevices. FIG. 6 illustrates the wheel system 100 passing over an obstacle O above the ground plane 1000 and FIG. 7 illustrates the wheel system 100 passing over an obstacle O below the ground plane 1000. The rotating arm 140 of the wheel system 100 allows the leading 110 and trailing 130 wheels to pivot around the central axle 135 when the wheel system 100 encounters an obstacle O. Depending on the obstacle O, the wheel system 100 comprises a set of configurations while traversing the obstacle O.

a. Configurations of the Wheel System Over a Crack

When the wheel system 100 encounters an obstacle O that extends below the ground plane 1000 (I.e. a crack), the wheel system 100 experiences a set of configurations as the wheel system 100 traverses the obstacle O. A first configuration is defined before the wheel system 100 interacts with the obstacle O such that the contact plane 3000 is coincident with the ground plane 1000 and all the wheels are rolling on the ground plane 1000. A second configuration is defined by when only the leading wheel 110 interacts with the obstacle O. The leading wheel 110 drops into the crack and the trailing wheel 130 is raised because the rotating arm 140 rotates about the central axle 135. The central wheel 120 is still in contact with the ground plane 1000 and supports all the weight of the luggage 300. The user does not feel the crack because the central wheel 120 has not dropped into the obstacle O. In this configuration, the contact plane 3000 of the wheel system 100 is not parallel to the ground plane 1000. A third configuration is defined when the leading wheel 110 exits the obstacle O on the other side. In this configuration, the central wheel 120 is suspended above the obstacle O and the weight of the luggage 300 is supported only by the leading 110 and trailing 130 wheels. The leading wheel 110 is on one side of the obstacle O while the trailing wheel 130 is on the other side of the obstacle O. In this configuration, the contact plane 3000 of the wheel system 100 is coincident with the ground plane 1000. A fourth configuration is defined when the central wheel 120 regains contact with the ground plane 1000. The trailing wheel 130 may drop into the crack and the leading wheel 110 may raise because the rotating arm 140 rotates about the central axle 135. In the fourth configuration, the contact plane 3000 may not be parallel or coincident with the ground plane 1000. The central wheel 120 supports all the weight of the luggage 300. During each of these configurations, the angle α between the reference plane 2000 and the contact plane 3000 remains constant.

As previously mentioned, this set of configurations allows for smooth passage over the obstacle O that extends below the ground plane 1000. It smooths out the obstacle O by eliminating or reducing any jolts or jerks. Jolts and jerks are felt by the user whenever the central wheel 120 undergoes drastic acceleration changes in a vertical direction and/or front to back direction. For example, when the central wheel 120 suddenly drops into the crack, the central wheel 120 experiences an acceleration change in the up and down direction. Further, when the central wheel 120 hits the opposite edge of the crack, the central wheel 120 undergoes a rapid deceleration in the front the back direction. However, in the set of configurations defined by the wheel system 100 traversing a crack, the central wheel 120 remains in contact with the ground plane in every configuration, eliminating jolts and jerks in the up and down direction. Furthermore, since the central wheel 120 does not drop into the crack, the central wheel 120 avoids and does not interact with the opposite edge of the crack. This will eliminate any decelerations in the front to back direction.

b. Configurations of the Wheel System Over a Bump

When the wheel system 100 encounters an obstacle O that extends above the ground plane 1000 (i.e. a bump or protuberance), the wheel system 100 experiences a set of configurations as the wheel system 100 traverses the obstacle O. A first configuration is defined before the wheel system 100 interacts with the obstacle O such that the contact plane 3000 is coincident with the ground plane 1000 and all the wheels are rolling on the ground plane 1000. A second configuration is defined by the initial interaction of the leading wheel 110 interacts with the obstacle O. The leading wheel 110 starts to roll up the protuberance and the arm 140 rotates. When the arm 140 rotates, the central wheel 120 is then lifted off of the ground plane 1000. The weight of the luggage 300 is supported by the leading wheel 110 and the trailing wheel 130. The contact plane 3000 of the wheel system 100 is not parallel to the ground plane 1000. The third configuration is when the leading wheel 110 exits the obstacle O on the other side. In this configuration, the central wheel 120 is suspended above the obstacle O and the weight of the luggage 300 is supported only by the leading 110 and trailing 130 wheels. The leading wheel 110 is in contact with the ground plane 1000 and the trailing wheel 130 is in contact with the obstacle O. During each of these configurations, the angle α remains constant between the reference plane 2000 and the contact plane 3000.

As previously mentioned, this set of configurations allows for smooth passage over the obstacle O that extends above the ground plane 1000. It smooths out the obstacle O by eliminating or reducing any jolts or jerks. Jolts or jerks are felt by the user whenever the central wheel 120 undergoes drastic acceleration changes in the up and down (vertical) direction and/or the front to back (horizontal) direction. For example, when a conventional wheel contacts a bump, the wheel experiences a deceleration in the up and down direction as well as the front to back direction. However, the design of the exemplary wheel system 100 effectively widens the bump, reducing the amount of deceleration felt by the user. The configurations effectively widens the bump by starting the raising of the central wheel 120 off the ground plane well before the central wheel 120 reaches the bump.

4. LATERAL OFFSET OF WHEELS

Figure 8:
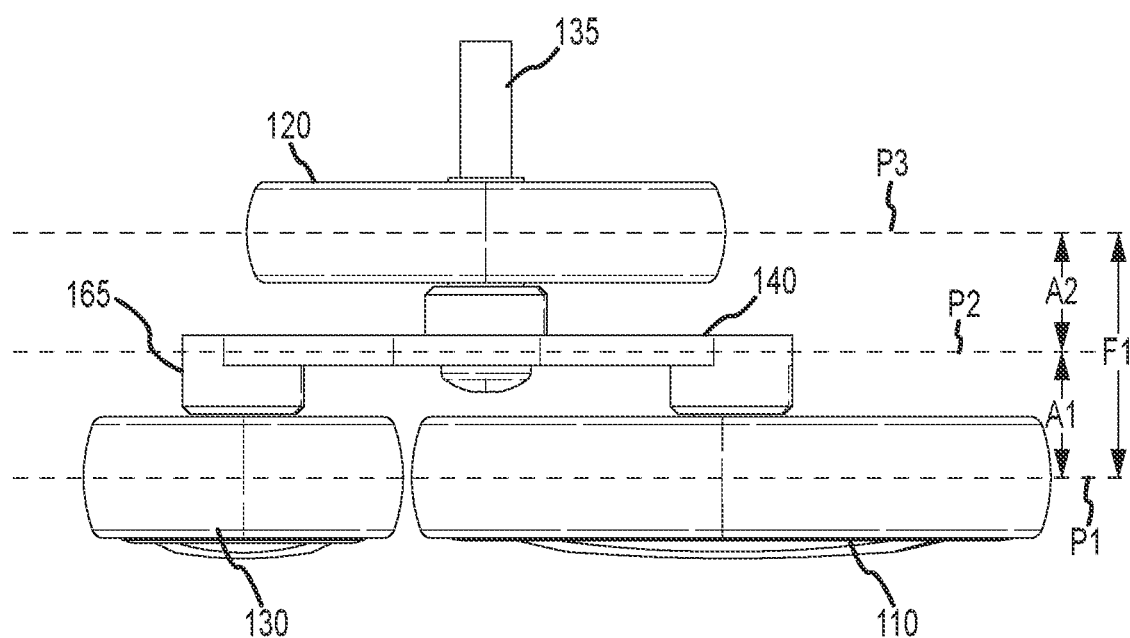
FIG. 8 illustrates a top view of the wheel system according to one embodiment.
Figure 9:
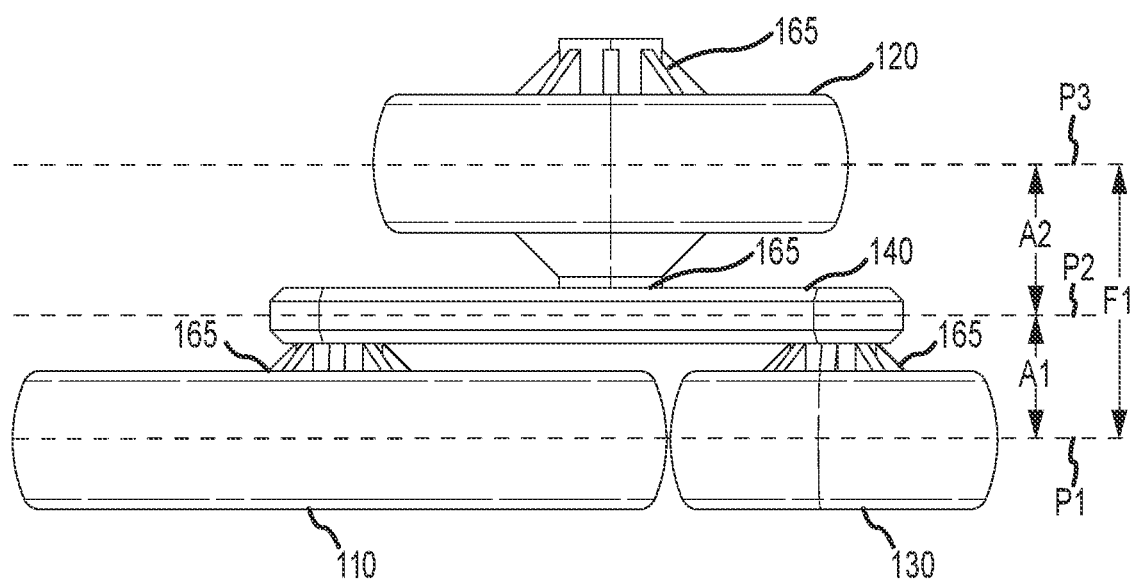
FIG. 9 illustrates a top view of the wheel system according to another embodiment.

In some embodiments, the wheels can be advantageously offset in the side-to-side direction (laterally) from the rotating arm 140 or from one another to improve stability. In some embodiments, the wheels can be advantageously offset in a lateral (side-to-side) direction. One or more wheels can be offset to shorten the overall distance of the wheel system 100 from front to back by allowing the profiles of offset wheels to overlap. The leading wheel 110 and trailing wheel 130 can be located on a first side of the rotating arm. The central wheel 120 can be located on a second side of the rotating arm 140, opposite the first side, as shown in FIG. 8 and FIG. 9. Different axles may extend from the rotating arm 140 from opposite surfaces such that the wheels may be laterally offset from one another. For example, the leading 110 and trailing 130 wheels may sit on axles extending from one surface of the rotating arm 140 and the central wheel 120 may sit on an axle extending from the opposite surface of the arm such that the rotating arm 140 is situated between the central wheel 120 and the leading 110 and trailing 130 wheels.

Laterally spacing the wheels allows for a compact design wherein the wheel system 100 is shorter in distance from front to back than it would be if all three wheels were located on the same side of the rotating arm 140. This allows the rotating arm 140 to be shorter and require less material. This also allows the wheels to overlap, further shortening the distance from front to back. Laterally spacing the wheels also provides stability by separating the points where each wheel contacts the ground plane 1000. This allows the wheels to engage a crack oriented in any direction relative to the path of travel without disturbance. Conventional luggage consists of only one generally very narrow wheel on either side of the bag. If a user rolling conventional luggage engages an elongated crack oriented parallel or nearly parallel to the direction of travel, the narrow wheel may drop completely into the crack and become stuck, causing the bag to abruptly jolt, be knocked off path, or topple over. Such disturbances can cause damage to the luggage and/or harm to the user. Due to the lateral spacing of the wheels in the present invention, even if one or two of the wheels in a wheel set roll directly over a crack in a direction parallel to the crack, the other wheel(s) laterally spaced from the wheel(s) in the crack will be outside of the crack and continue rolling along the ground plane 1000 without disturbance.

a. Spacers

Figure 10:
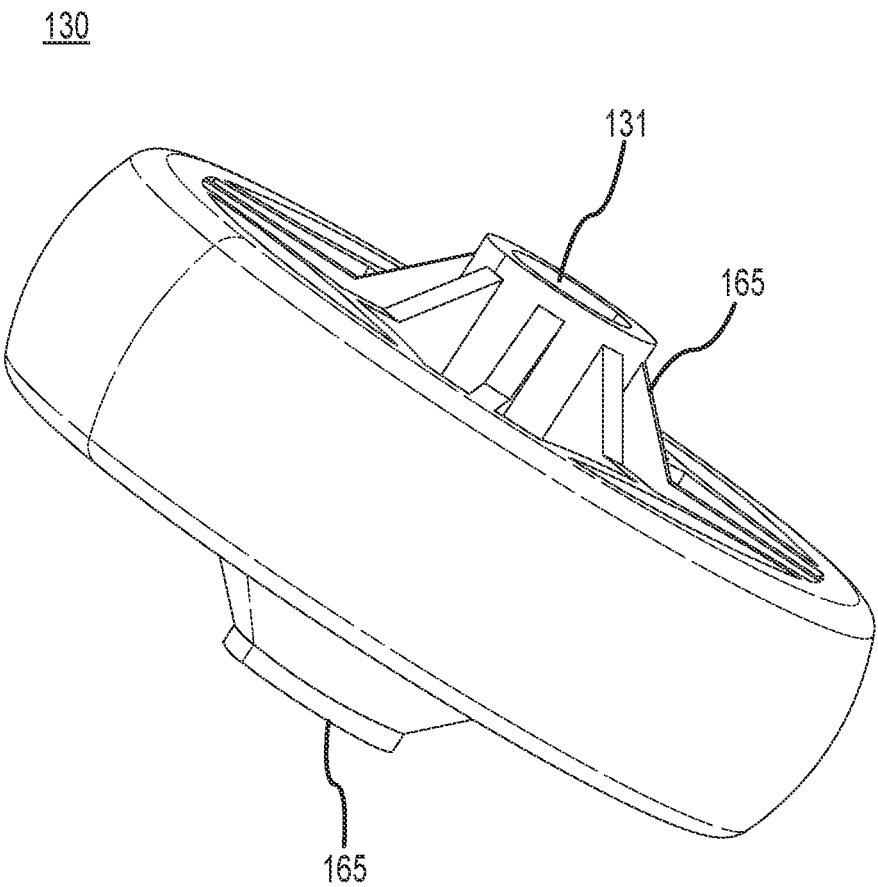
FIG. 10 illustrates a perspective view of a wheel according to one embodiment.

To achieve the desired offset, the wheel system 100 can further comprise one or more spacers 165, as shown in FIG. 8. The spacers 165 can be located between the one or more wheels and the rotating arm 140. The spacer 165 can comprise a diameter or width less than that of the adjacent wheel. The spacer 165 can define a center aperture. One spacer 165 can be located between the leading wheel 110 and rotating arm 140, such that the spacer 165 receives the leading axle 151 within its aperture, securing it between the wheel 110 and rotating arm 140. Another spacer 165 can additionally be located between the trailing wheel 130 and rotating arm 140, receiving the trailing axle 152 in a similar manner. In some embodiments, the leading 110 and trailing 130 wheels can be laterally offset from the rotating arm 140. The width of the one or more spacers 165 can control the distance the wheels are offset from the rotating arm 140. In particular, the spacers 165 can be different widths in order to offset the wheels a desired distance from the rotating arm 140. In some embodiments, the spacers 165 can be integral to the rotating arm 140. In other embodiments, the spacers 165 can be integral to the one or more wheels, as illustrated in FIGS. 9-10.

In some embodiments, the width of the one or more spacers 165 can range between approximately 0.1 inches and 1.0 inches. In some embodiments, the width of the one or more spacers 165 can be between 0.1 inches and 0.25 inches, between 0.25 inches and 0.5 inches, between 0.5 inches and 0.75 inches, or between 0.75 inches and 1.0 inches. In some embodiments, the width of the one or more spacers 165 can be between 0.1 inches and 0.3 inches, between 0.2 inches and 0.4 inches, between 0.3 inches and 0.5 inches, between 0.4 inches and 0.6 inches, between 0.5 inches and 0.7 inches, between 0.6 inches and 0.8 inches, between 0.7 inches and 0.9 inches, or between 0.8 inches and 1.0 inches. For example, the width of the one or more spacers can be 0.1 inches, 0.15 inches, 0.2 inches, 0.25 inches, 0.3 inches, 0.35 inches, 0.4 inches, 0.45 inches, 0.5 inches, 0.55 inches, 0.6 inches, 0.7 inches, 0.75 inches, 0.8 inches, 0.85 inches, 0.9 inches, 0.95 inches, or 1.0 inches.

b. Offset Distances

As described, the offset of the wheels plays an important role in promoting stability and allowing for a compact design. The offset of the wheels can be characterized by the distance between various planes housing the wheels. A first plane P1 parallel to the rotating arm is defined through the leading wheel 110 and trailing wheel 120. A second plane P2 is defined through the midline of the rotating arm 140. The distance A1 between the first plane P1 and second plane P2 defines the amount the leading wheel 110 and trailing wheel 120 are offset from the rotating arm 140. A third plane P3 parallel to the rotating arm 140 is defined through the central wheel 120. The distance A2 between the second plane P2 and the third plane P3 defines the amount the central wheel 120 is offset from the rotating arm 140.

In many embodiments, the leading wheel 110 and trailing wheel 130 can be laterally offset from the rotating arm 140 by a distance ranging between 0.25 inches and 1.0 inches. In some embodiments, the leading wheel 110 and trailing wheel 130 are offset from the rotating arm 140 by a distance between 0.25 inches and 0.40 inches, between 0.40 inches and 0.65 inches, between 0.65 inches and 0.80 inches, or between 0.80 inches and 1.0 inches. In other embodiments, the leading wheel 110 and trailing wheel 130 are offset from the rotating arm 140 by a distance between 0.25 inches and 0.50 inches, between 0.50 inches and 0.75 inches, or between 0.75 inches and 1.0 inches. For example, the leading wheel 110 and trailing wheel 130 can be offset by 0.25 inches, 0.30 inches, 0.35 inches, 0.40 inches, 0.45 inches, 0.50 inches, 0.55 inches, 0.60 inches, 0.65 inches, 0.70 inches, 0.75 inches, 0.80 inches, 0.85 inches, 0.90 inches, 0.95 inches, or 1.0 inches from the rotating arm 140.

In many embodiments, the central wheel 120 can be offset from the rotating arm 140 by a distance ranging between 0.25 inches and 1.0 inches. In some embodiments, the central wheel 120 is offset from the rotating arm 140 by a distance between 0.25 inches and 0.40 inches, between 0.40 inches and 0.65 inches, between 0.65 inches and 0.80 inches, or between 0.80 inches and 1.0 inches. In other embodiments, the central wheel 120 is offset from the rotating arm 140 by a distance between 0.25 inches and 0.50 inches, between 0.50 inches and 0.75 inches, or between 0.75 inches and 1.0 inches. For example, the central wheel 120 can be offset from the rotating arm 140 by 0.1 inches, 0.15 inches, 0.2 inches, 0.25 inches, 0.3 inches, 0.35 inches, 0.4 inches, 0.45 inches, 0.5 inches, 0.55 inches, 0.6 inches, 0.7 inches, 0.75 inches, 0.8 inches, 0.85 inches, 0.9 inches, 0.95 inches, or by 1.0 inches.

In other embodiments, the leading wheel 110 and trailing wheel 130 can be offset from the rotating arm 140 at non-uniform distances. For example, the leading wheel 110 can be offset from the rotating arm 140 further than the trailing wheel 130. Conversely, the trailing wheel 130 can be offset from the rotating arm 140 further than the leading wheel 110. Staggered offset distances as described would allow the leading wheel 110 and trailing wheel 130 to couple with the rotating arm 140 proximal to each other in such a way that the wheels overlap. Doing so would further shorten the necessary length of the rotating arm 140, allowing for less material to be used.

5. WHEEL DESCRIPTION a. Wheel Diameters

Referring back to FIG. 4, each wheel may be characterized by a diameter. In some embodiments, the wheels all have different diameters with respect to one another. Preferably, the leading wheel 110 may comprise the largest diameter D1, the trailing wheel 130 may comprise the smallest diameter D3, and the central wheel 120 may comprise a diameter D2 that is smaller than the diameter D1 of the leading 110 wheel but larger than the diameter D3 of the trailing wheel 130. The leading wheel 110 is sized with a large diameter to efficiently overcome obstacles O. The trailing wheel 130 is preferably sized with a smaller diameter in order to minimize the overall width of the wheel system 100. This allows the wheel system 100 to have a compact design while ensuring functionality.

In many embodiments, the diameter D1 of the leading wheel 110 may range between 3-5 inches. In some embodiments, the diameter D1 of the leading wheel 110 may range between 3 inches and 3.5 inches, between 3.5 inches and 4.0 inches, between 4.0 inches and 4.5 inches, or between 4.5 inches and 5 inches. In other embodiments, the diameter D1 of the leading wheel 110 may range between 3 inches and 4 inches or between 4 inches and 5 inches. For example, the diameter D1 of the leading wheel 110 can be 3 inches, 3.1 inches, 3.2 inches, 3.3 inches, 3.4 inches, 3.5 inches, 3.6 inches, 3.7 inches, 3.8 inches, 3.9 inches, 4.0 inches, 4.1 inches, 4.2 inches, 4.3 inches, 4.4 inches, 4.5 inches, 4.6 inches, 4.7 inches, 4.8 inches, 4.9 inches, or 5.0 inches, In many embodiments, the diameter D2 of the central wheel 120 may range between 60% to 90% of the total diameter D1 of the leading wheel 110. In some embodiments, the diameter D2 of the central wheel 120 may range between 60% and 70%, between 70% and 80%, or between 80% and 90% of the total diameter D1 of the leading wheel 110. In other embodiments, the diameter D2 of the central wheel 120 may range between 60% and 75% or between 75% and 90% of the total diameter D1 of the leading wheel 110. For example, the diameter D2 of the central wheel 120 can be 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% of the total diameter D1 of the leading wheel 110.

In many embodiments, the diameter D2 of the central wheel 120 may range between 2.0 inches and 4.0 inches. In some embodiments, the diameter D2 of the central wheel 120 may range between 2 inches and 2.5 inches, between 2.5 inches and 3.0 inches, between 3.0 inches and 3.5 inches, or between 3.5 inches and 4.0 inches. In other embodiments, the diameter D2 of the central wheel 120 may range between 2.0 inches and 3.0 inches or between 3.0 inches and 4.0 inches. For example, the diameter D2 of the central wheel 120 may be 2.0 inches, 2.05 inches, 2.1 inches, 2.15 inches, 2.2 inches, 2.25 inches, 2.3 inches, 2.35 inches, 2.4 inches, 2.45 inches, 2.5 inches, 2.55 inches, 2.6 inches, 2.65 inches, 2.7 inches, 2.75 inches, 2.8 inches, 2.85 inches, 2.9 inches, 2.95 inches, 3.0 inches, 3.05 inches, 3.1 inches, 3.15 inches, 3.2 inches, 3.25 inches, 3.3 inches, 3.35 inches, 3.4 inches, 3.45 inches, 3.5 inches, 3.55 inches, 3.6 inches, 3.65 inches, 3.7 inches, 3.75 inches, 3.8 inches, 3.85 inches, 3.9 inches, 3.95 inches, or 4.0 inches.

In many embodiments, the diameter D3 of the trailing wheel 130 may range between 35% and 65% of the total diameter D1 of the leading wheel 110. In some embodiments, the diameter D3 of the trailing wheel 130 may range between 35% and 45%, between 45% and 55%, or between 55% and 65% the total diameter D1 of the leading wheel 110. In other embodiments, the diameter D3 of the trailing wheel 130 may range between 35% and 50% or between 50% and 60% the total diameter D1 of the leading wheel 110. For example, the diameter D3 of the trailing wheel 130 may be 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, or 65% of the total diameter D1 of the leading wheel 110.

In many embodiments, the diameter D3 of the trailing wheel 130 may range between 1.0 inches and 3.0 inches. In some embodiments, the diameter D3 of the trailing wheel 130 may range between 1.0 inches and 1.5 inches, between 1.5 inches and 2.0 inches, between 2.0 inches and 2.5 inches, or between 2.5 inches and 3.0 inches. In other embodiments, the diameter D3 of the trailing wheel 130 may range between 1.0 inches and 2.0 inches or between 2.0 inches and 3.0 inches. For example, the diameter D3 of the trailing wheel 130 may be 1.0 inches, 1.05 inches, 1.10 inches, 1.15 inches, 1.20 inches, 1.20 inches, 1.25 inches, 1.30 inches, 1.35 inches, 1.40 inches, 1.45 inches, 1.50 inches, 1.55, 1.60 inches, 1.65 inches, 1.70 inches, 1.75 inches, 1.80 inches, 1.85 inches, 1.90 inches, 1.95 inches, 2.0 inches, 2.05 inches, 2.10 inches, 2.15 inches, 2.20 inches, 2.25 inches, 2.30 inches, 2.35 inches, 2.40 inches, 2.45 inches, 2.50 inches, 2.55 inches, 2.60 inches, 2.65 inches, 2.70 inches, 2.75 inches, 2.80 inches, 2.85 inches, 2.90 inches, 2.95 inches, or 3.0 inches.

b. Wheel System Measurements

Referring to FIG. 5, the compact size of the wheel system 100 can be characterized by a maximum height $M_H$ and a maximum width $M_W$. The maximum height $M_H$ of the wheel system 100 is defined by the leading wheel diameter D1. The maximum width $M_W$ can be measured as the distance between a forwardmost portion of the leading wheel 110 and a rearward most portion of the trailing wheel 130. The maximum width $M_W$ of the wheel system 100 can be defined by a width greater than or equal to the diameter D1 of the leading wheel 110 plus the diameter D3 of the trailing wheel 130. The location of the wheels on opposite sides of the rotating arm 140 minimizes the maximum width $M_W$ and allows for a more compact design compared to a standard wheel assembly in which the wheels are directly adjacent. The smaller diameter D3 of the trailing wheel 130 further reduces the maximum width $M_W$.

In many embodiments, the maximum height $M_H$ of the wheel system 100 ranges between 3.0 inches and 5.0 inches. In some embodiments, the maximum height $M_H$ of the wheel system 100 ranges between 3.0 inches and 3.5 inches, between 3.5 inches and 4.0 inches, between 4.0 inches and 4.5 inches, or between 4.5 inches and 5.0 inches. In other embodiments, the maximum height $M_H$ of the wheel system 100 ranges between 3.0 inches and 4.0 inches or between 4.0 inches and 5.0 inches. For example, the maximum height $M_H$ of the wheel system 100 can be 3.0 inches, 3.1 inches, 3.2 inches, 3.3 inches, 3.4 inches, 3.5 inches, 3.6 inches, 3.7 inches, 3.8 inches, 3.9 inches, 4.0 inches, 4.1 inches, 4.2 inches, 4.3 inches, 4.4 inches, 4.5 inches, 4.6 inches, 4.7 inches, 4.8 inches, 4.9 inches, or 5.0 inches.

In many embodiments, the maximum width $M_W$ of the wheel system 100 ranges between 5.0 inches and 7.0 inches. In some embodiments, the maximum width $M_W$ of the wheel system 100 ranges between 5.0 inches and 5.5 inches, between 5.5 inches and 6.0 inches, between 6.0 inches and 6.5 inches, or between 6.5 inches and 7.0 inches. In other embodiments, the maximum width $M_W$ of the wheel system 100 ranges between 5.0 inches and 6.0 inches or between 6.0 inches and 7.0 inches. For example, the maximum width $M_W$ of the wheel system 100 can be 5.0 inches, 5.1 inches, 5.2 inches, 5.3 inches, 5.4 inches, 5.5 inches, 5.6 inches, 5.7 inches, 5.8 inches, 5.9 inches, 6.0 inches, 6.1 inches, 6.2 inches, 6.3 inches, 6.4 inches, 6.5 inches, 6.6 inches, 6.7 inches, 6.8 inches, 6.9 inches, or 7.0 inches.

The maximum width $M_W$ of the wheel system 100 depends on the diameters of the wheels as well as a front-to-rear spacing of the wheels. Referring back to FIG. 4, the front-to-rear spacing of the wheels can be characterized by a front-to-rear distance A3 measured between the first focus F1 and the second focus F2 and a front-to-rear distance A4 measured between the second focus F2 and the third focus F3. In many embodiments, the respective front-to-rear distances A3, A4 may be substantially similar to each other. In other embodiments, the respective front-to-rear distances, A3, A4 may be different.

In some embodiments, at least one of the front-to-rear wheel spacing distances A3, A4 can range between 0.5 inches and 2.5 inches. In some embodiments, at least one of the wheel spacing distances A3, A4 can be between 0.5 inches and 0.75 inches, between 0.75 inches and 1.0 inches, between 1.0 inches and 1.25 inches, between 1.25 inches and 1.5 inches, between 1.5 inches and 1.75 inches, between 1.75 inches and 2.0 inches, between 2.0 inches and 2.25 inches, or between 2.25 inches and 2.5 inches. In other embodiments, at least one of the wheel spacing distances A3, A4 can be between 0.5 inches and 1.0 inches, between 0.75 inches and 1.25 inches, between 1.0 inches and 1.5 inches, between 1.25 inches and 1.75 inches, between 1.5 inches and 2.0 inches, between 1.75 inches and 2.25 inches, or between 2.0 inches and 2.5 inches. For example, the at least one of the front-to-rear wheel spacing distances A3 and/or A4 can be 0.5 inches, 0.55 inches, 0.6 inches, 0.65 inches, 0.7 inches, 0.75 inches, 0.8 inches, 0.85 inches, 0.9 inches, 0.95 inches, 1.0 inches, 1.05 inches, 1.1 inches, 1.15 inches, 1.2 inches, 1.25 inches, 1.3 inches, 1.35 inches, 1.4 inches, 1.45 inches, 1.5 inches, 1.55 inches, 1.6 inches, 1.65 inches, 1.7 inches, 1.75 inches, 1.8 inches, 1.85 inches, 1.9 inches, 1.95 inches, 2.0 inches, 2.05 inches, 2.1 inches, 2.15 inches, 2.2 inches, 2.25 inches, 2.3 inches, 2.35 inches, 2.4 inches, 2.45 inches, or 2.5 inches.

As discussed above, the wheel system 100 advantageously comprises a large leading wheel 110 for easily overcoming obstacles O, while retaining a compact overall size. The compact design of the wheel system 100 can be characterized by a ratio R defined by the maximum height $M_H$ divided by the maximum width $M_W$. The larger the ratio R is, the bigger the leading wheel 110 is in proportion to the maximum width $M_W$ of the system 100. Therefore, the ratio R between the maximum height $M_H$ and the maximum width $M_W$ is a measure of the balance between the wheel system's 100 ability to smoothly traverse obstacles O (due to a relatively large leading wheel) and the wheel system's 100 compact size.

In some embodiments, the ratio R between the maximum height $M_H$ and the maximum width $M_W$ can be greater than approximately 0.50. In other embodiments the ratio R between the maximum height $M_H$ and the maximum width $M_W$ can be greater than 0.55, greater than 0.60, greater than 0.65, greater than 0.70, greater than 0.75, greater than 0.80, greater than 0.85, greater than 0.90, or greater than 0.95. In some embodiments, the ratio R between the maximum height $M_H$ and the maximum width $M_W$ can be approximately 0.50, approximately 0.55, approximately 0.60, approximately 0.65, approximately 0.70, approximately 0.75, approximately 0.80, approximately 0.85, approximately 0.90, or approximately 0.95. The wheel system 100 comprising a ratio R greater than 0.50 is a direct effect of providing a trailing wheel 130 that is smaller in diameter than the leading wheel 110. A wheel system of a similar design but having uniform wheel diameters would necessitate a ratio R less than 0.50, because the maximum width of such a system would need to be at least twice the leading wheel diameter in order to accommodate both leading and trailing wheel having the same diameter.

The weight of the wheel system 100 may be determined by the sum of the weight of wheel system 100 features. In many embodiments, the weight of the wheel system 100 can range between 1.0 pound and 5.0 pounds. In some embodiments, the weight of the wheel system 100 can range between 1.0 pound and 2.0 pounds, 2.0 pounds and 3.0 pounds, 3.0 pounds and 4.0 pounds, or between 4.0 pounds and 5.0 pounds. In other embodiments, the weight of the wheel system 100 can range between 1.0 pound and 2.5 pounds or between 2.5 pounds and 5.0 pounds. For example, the wheel system 100 can weigh approximately 1.0 pound, approximately 1.5 pounds, approximately 2.0 pounds, approximately 2.5 pounds, approximately 3.0 pounds, approximately 3.5 pounds, approximately 4.0 pounds, approximately 4.5 pounds, or approximately 5.0.

c. Wheel Durometer and Material

Each wheel may be further characterized by a durometer and a material. One or more wheels may have a similar durometer with respect to one or more other wheels. Preferably, all three wheels may have a similar durometer. The durometer of the wheel system 100 can be customized to best accommodate the desired function of the wheel system 100. Increased durometer in the wheels may also increase the longevity of the wheel's lifespan. Conversely, lower durometer in the wheels could increase the flexibility and promote a smoother roll over cracks or obstructions. As such, the durometer for each wheel can be determined by the intended use of the wheel. For example, a wheel system in connection with luggage would be used by a person during travel, typically with a handle. The desired function of the wheel would be alleviating shock or impact of obstructions felt by the user through said handle. For this reason, a wheel system with shock-absorbing properties such as a relatively lower durometer would further promote the smooth rolling capability of the wheel system.

In some embodiments, the durometer of one or more wheels can range between approximately 78 A-98 A. In other embodiments, the durometer of one or more wheels can be between approximately 78 A-80 A, 80 A-82 A, 82 A-84 A, 84 A-86 A, 86 A-88 A, 88 A-90 A, 90 A-92 A, 92 A-94 A, 94 A-96 A, or 96 A-98 A. In some embodiments, the wheel durometer value can be 78 A, 79 A, 80 A, 81 A, 82 A, 83 A, 84 A, 85 A, 86 A, 87 A, 88 A, 89 A, 90 A, 91 A, 92 A, 93 A, 94 A, 95 A, 96 A, 97 A, or 98 A.

The material of the wheel system 100 can also influence the durometer. In many embodiments, one or more wheels can be constructed of a material selected from the group comprising: thermoplastic resins, thermoplastic polyurethane, thermosetting resins, aromatic diisocyanates, toluene diisocyanate (TDI), methylenediphenyl diisocyanate (MDI), nylon, polypropylene, polyethylene, or any material suitable for creating a wheel. In some embodiments, the material of the central wheel 120 is the same as the material of the leading wheel 110 and/or trailing wheel 130. In other embodiments, the central wheel 120 can be constructed of a first material selected from the above group while the leading wheel 110 and/or trailing wheel 130 are constructed of a second material selected from the above group.

In some embodiments, the wheel system 100 can further comprise one or more outer rims 155 on the one or more wheels. The one or more rim 155 can comprise a width equal to and diameter slightly larger than that of the wheel with which it connects. The rim 155 can encompass the wheel and act as a barrier against the ground surface in order to alleviate traction and/or wear on the one or more wheels. Similar to the wheel itself, the material of the rim 155 can be customized according to desired use. The outer rim 155 of a given wheel can be the same or a different material than that of the wheel. The wide range of combinations for materials of the one or more wheel and one or more rim 155 allow for increased functionality dependent on intended application of the wheel system. For example, the outer rim 155 can be comprised of a material with a higher durometer than that of the wheel, such as nylon, polypropylene, polyethylene, or a material with similar properties selected from the list above. In another example, the outer rim 155 can be comprised of a material with a lower durometer than that of the wheel, such as rubber or a material with similar properties selected from the list above. An outer rim 155 material with a lower durometer may absorb shock more readily than a harder material, while an outer rim 155 material with a high durometer may have better durability. Inclusion of the outer rim 155 can allow an outer portion of the wheel that contacts the ground to be softer while the interior portion of the wheel comprises a harder material that provides structural support and durability.

d. Hubcaps

Figure 11:
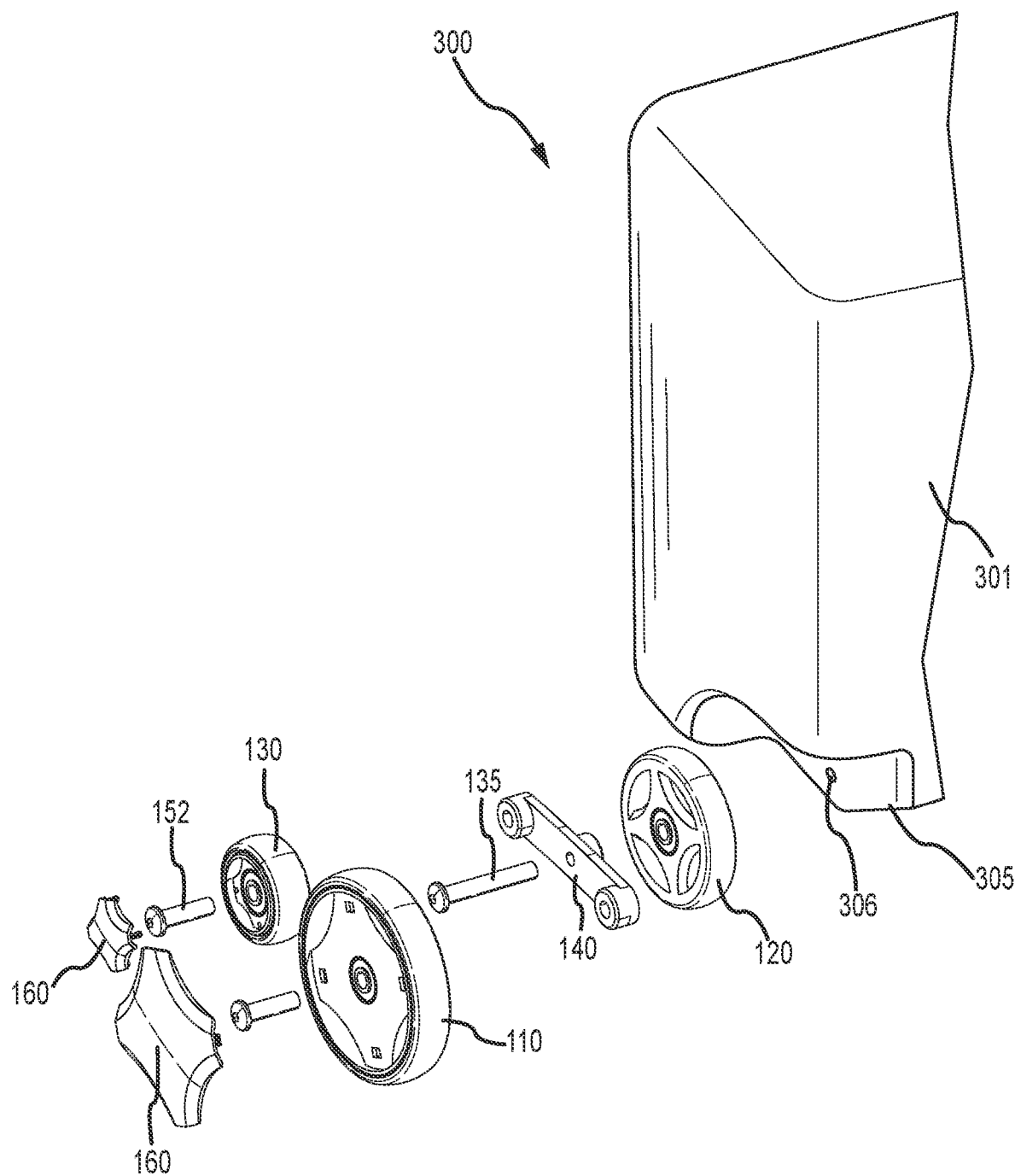
FIG. 11 illustrates an exploded view of the wheel system connection to the luggage body.

In some embodiments, the wheel system 100 can further comprise one or more hubcaps 160 on the one or more wheels, as seen in FIG. 11. The one or more hubcaps 160 can couple to the exterior of the one or more wheels. This can provide the wheel system 100 with a smooth aesthetic and protect the wheel from wear. The one or more hubcaps 160 can comprise any shape able to fit within the outer rim of the one or more wheels. For example, the one or more hubcaps 160 can comprise a circular shape with a diameter complimentary to the diameter of the wheel to which it is attached. In another example, the one or more hubcaps can comprise an X-shape.

6. ALTERNATIVE EMBODIMENT

In some embodiments, the leading wheel 110 and trailing wheel 130 can comprise multiple parts (not pictured). The wheel parts can comprise the same diameter in order to make contact with the ground plane 1000 at the same point in time. The wheel parts of the leading wheel 110 can couple with the rotating arm 140 via the leading axle 151. The wheel parts of the trailing wheel 130 can couple with the rotating arm 140 via the trailing axle 152. In some embodiments, the three wheels are coupled to the rotating arm 140 on the same side. In further embodiments, the central wheel 120 can fit between the wheel parts of the leading wheel 110 and trailing wheel 130. For example, a first wheel part of the leading wheel 110 and a first wheel part of the trailing wheel 130 can couple to the rotating arm 140 via their respective axles, followed by the central wheel 120 coupled to the rotating arm via the central axle 135, then a second wheel part of the leading wheel 110 and a second wheel part of the trailing wheel 130 can couple with the rotating arm 140 via their respective axles. In this example, the second wheel parts of the leading wheel 110 and trailing wheel 130 are offset from the rotating arm 140 at a greater distance than the first wheel parts of the leading wheel 110 and trailing wheel 130 to allow the central wheel 120 to fit between them. The wheels are then able to overlap, reducing the maximum width $M_W$ for a compact design.

7. PREFERRED LUGGAGE EMBODIMENT

Figure 12:
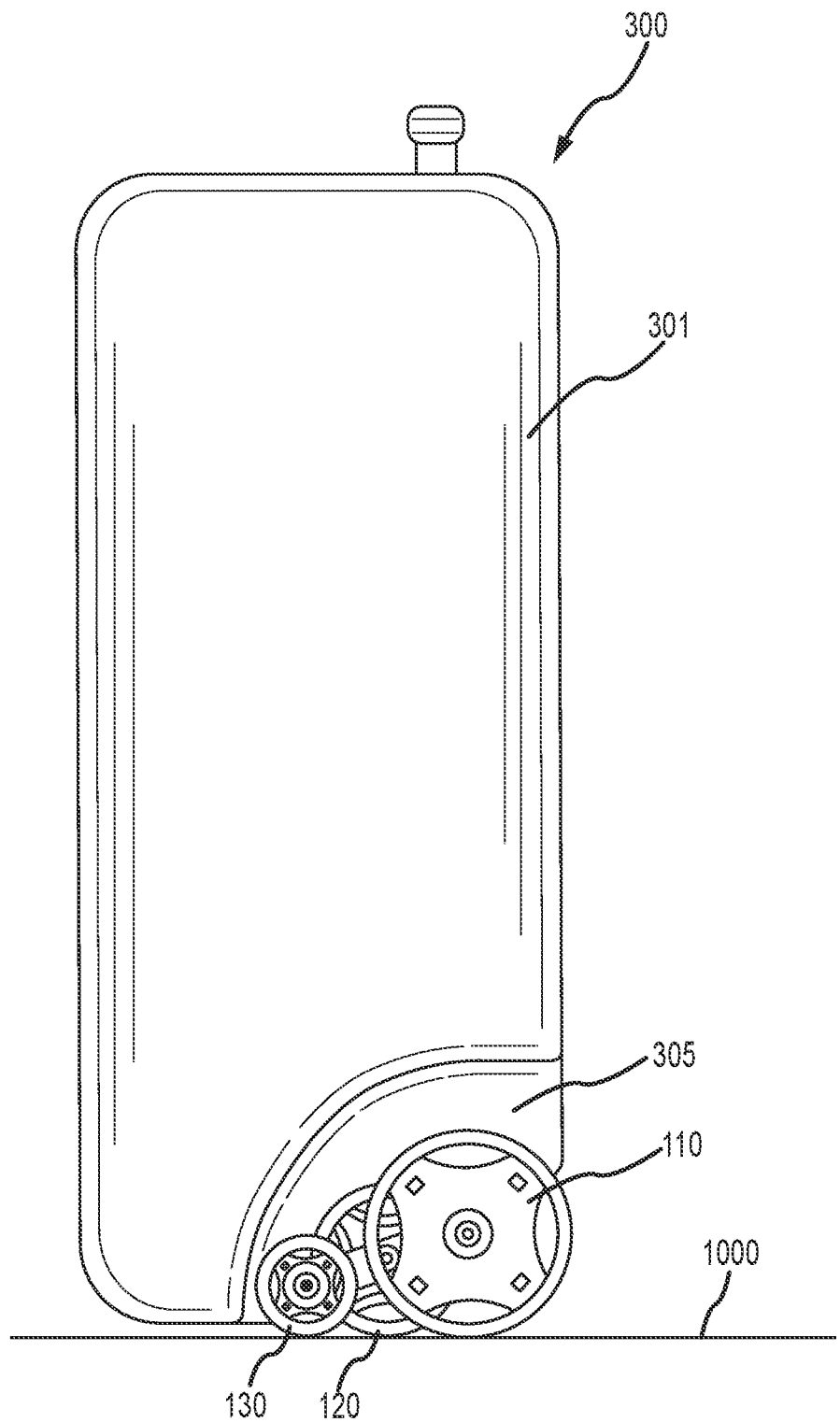
FIG. 12 illustrates a side view of the wheel system in connection with luggage via the central axle.
Figure 13:
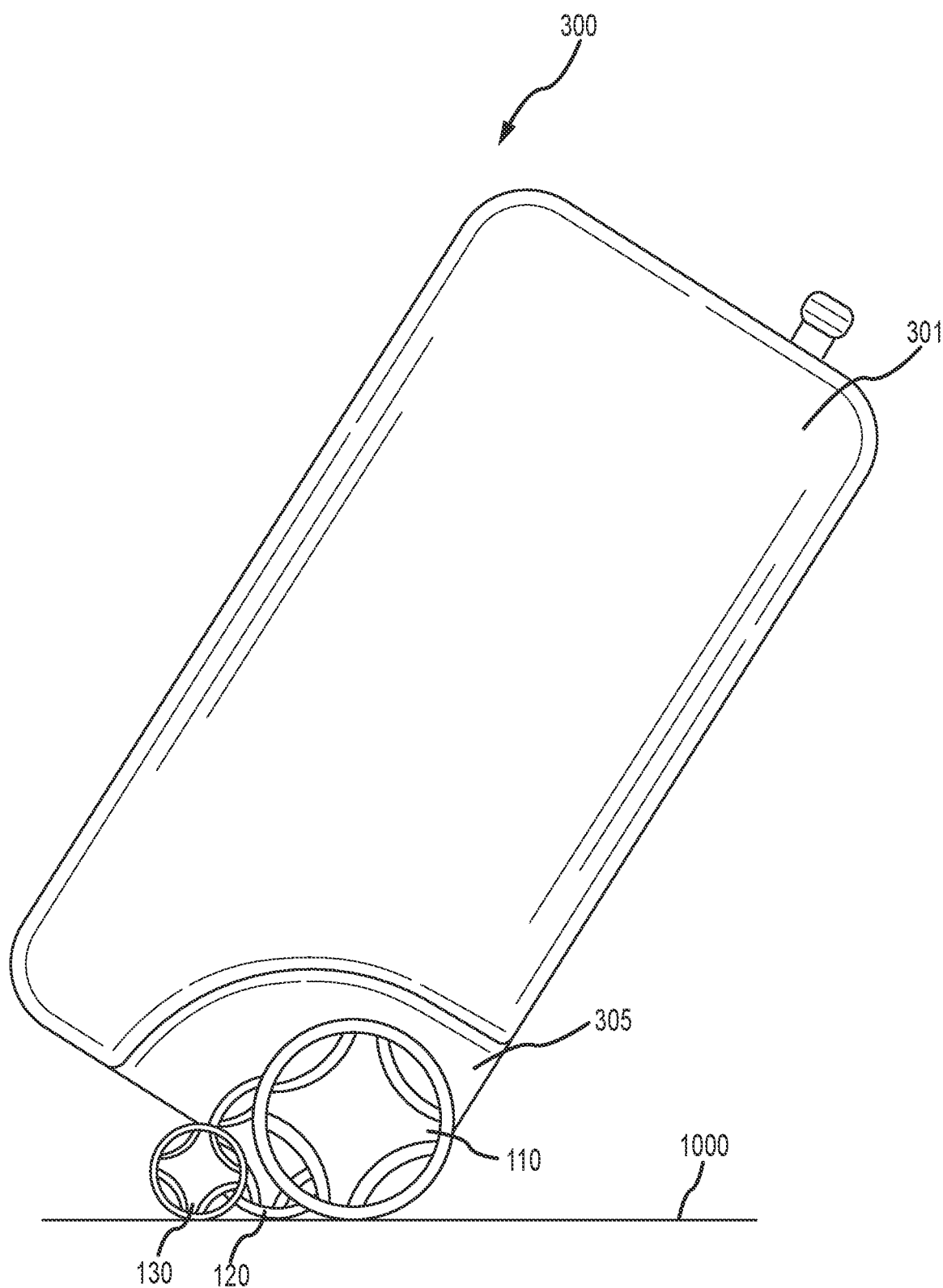
FIG. 13 illustrates a side view of the wheel system in connection with the luggage under normal rolling conditions.

Preferably, as shown in FIG. 12, the wheel system 100 described herein applies to luggage 300. In some embodiments, the luggage 300 may comprise a handle on the top side of the body for the user to hold and pull in order to transport the luggage 300. The luggage 300 may further comprise one or more wheel wells 305 formed as recesses from the body of the luggage 301. Each wheel well 305 may house a separate wheel system 100. In order to minimize the exterior volume of the luggage 300, each wheel well 305 may be formed such that the wheel system 100 housed within does not extend past a perimeter of the luggage body 301 shape. The wheel wells 305 may be formed near an edge formed by the front and bottom of the luggage 300 so that when the luggage 300 is tilted towards the edge, the wheels are the only part of the luggage 300 contacting the ground and the luggage 300 is able to be rolled, as illustrated in FIG. 13. The wheel wells 305 may be formed on sides opposite one another. Each wheel well 305 may further comprise an axle receiving port 306 for connecting the wheel system 100 to the luggage 300. The axle receiving port 306 may take the form of a bore, a hole, or any other means suitable of receiving and securing an axle. Preferably, the axle receiving port 306 of the wheel well 305 may receive the central axle 135 such that the central wheel 120 is proximate to the wheel well 305. In some embodiments, the luggage body can extend over the wheel wells 305 allowing the wheel systems 100 to fit internally within the luggage 300.

8. EXAMPLES

Example 1

The acceleration over a 1-inch bump of an exemplary wheel system according to the present invention was compared to a control wheel system comprising 2 wheels. The exemplary wheel system comprises two wheel sets which further comprise a leading wheel, central wheel, and trailing wheel (6 wheels total). The acceleration of the wheel systems was measured by an accelerometer during each trial. Table 1 below displays the results of the comparison. The value displayed for each trial is the average acceleration of the wheel system, measured in the direction opposite of motion. Higher magnitudes correspond to greater acceleration changes and therefore greater force applied to the wheel system by the bump. The bump causes the wheel system to experience a change in acceleration because at first, the wheel system experiences a decreased acceleration due to the wheel system going up the first half of the bump, followed by an increase in acceleration when going down the second half of the bump.

TABLE 1

| Wheel System | Trial 1 Acceleration | Trial 2 Acceleration (G) | Trial 3 Acceleration (G) | Average Acceleration (G) |
| --- | --- | --- | --- | --- |
| 2 wheel | 5.16 | 3.04 | 3.86 | 4.02 |
| 6 wheel | 2.36 | 3.21 | 2.29 | 2.62 |

The exemplary wheel system experienced 1.40 (G) less acceleration than the control wheel system. This lower acceleration value of the exemplary wheel system translates to less force applied to the wheel system by the bump. Therefore, the exemplary wheel system will provide the user with a smoother ride because the user will feel less of a force when traveling over bumps.

Example 2

The acceleration over a 1-inch expansion crack of an exemplary wheel system according to the present invention was compared to a control wheel system comprising 2 wheels. The exemplary wheel system comprises two wheelsets which further comprise a leading wheel, central wheel, and a trailing wheel (6 wheels total). The acceleration of the wheel system was measured by an accelerometer during each trial. Table 2 below displays the results of the comparison. The number displayed for each trial is the average acceleration of the wheel system, measured in the direction opposite of motion (positive numbers correlates to deceleration). Higher magnitudes correspond to greater acceleration changes and therefore greater force applied to the wheel system by the crack. The crack causes the wheel system to experience a change in acceleration because the wheel will drop and hit the edge of the crack, slowing the wheel system down.

TABLE 2

| Wheel System | Trial 1 Acceleration (G) | Trial 2 Acceleration (G) | Trial 3 Acceleration (G) | Trial 4 Acceleration (G) | Average Acceleration (G) |
|---|---|---|---|---|---|
| 2 wheel | 6.95 | 6.21 | 6.03 | 6.30 | 6.38 |
| 6 wheel | 1.85 | 1.16 | 1.87 | 2.21 | 1.77 |

The exemplary wheel system experienced 4.61 (g) less average acceleration than the control wheel system. This lower acceleration value of the exemplary wheel system translates to less force applied to the wheel system by the crack. Therefore, the exemplary wheel system will provide the user with a smoother ride because the user will feel force when traveling over cracks.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

Various features and advantages of the disclosure are set forth in the following.

Clause 1: A wheel system comprising a leading wheel having a first diameter and a first focus, a central wheel having a second diameter and a second focus, a trailing wheel having a third diameter and a third focus, a rotating arm, a leading axle, a central axle, a trailing axle, wherein the first diameter is greater than the second diameter; the second diameter is greater than the third diameter; the rotating arm comprises a leading end and a trailing end; the leading axle rotatably couples the leading wheel to the leading end of the rotating arm; the trailing axle rotatably couples the trailing wheel to the trailing end of the rotating arm; the central wheel is rotatably coupled about the central axle; the rotating arm is rotatably coupled about the central axle; the central axle is located between the leading end and the trailing end; the central wheel is located on a first side of the rotating arm; the leading wheel and the trailing wheel are located on a second side of the rotating arm, opposite the first side; the rotating arm defines a reference plane extending through the first focus, the second focus, and the third focus; the wheel system defines a contact plane tangent to the leading wheel, the central wheel, and the trailing wheel; and the reference plane and the contact plane form an acute angle.

Clause 2: The wheel system of clause 1, wherein the acute angle between the contact plane and the reference plane is between 10 degrees and 60 degrees.

Clause 3: The wheel system of clause 2, wherein the acute angle between the contact plane and the reference plane is between 10 degrees and 30 degrees.

Clause 4: The wheel system of clause 1, wherein the acute angle between the contact plane and the reference plane is between 10 degrees and 30 degrees.

Clause 5: The wheel system of clause 1, wherein the central wheel is offset from the rotating arm by a distance between 0.40 inches and 0.65 inches.

Clause 6: The wheel system of clause 1, wherein the second diameter is between 60% and 90% of the first diameter; and wherein the third diameter is between 35% and 65% of the first diameter.

Clause 7: The wheel system of clause 1, further comprising a spacer located on at least one of the leading axle, the central axle, and the trailing axle, between the rotating arm and at least one of the leading wheel, the central wheel, and the trailing wheel.

Clause 8: The wheel system of clause 7, wherein the spacer comprises a spacer width between 0.4 inches and 0.6 inches.

Clause 9: The wheel system of clause 7, wherein the spacer is integrally formed with the rotating arm.

Clause 10: The wheel system of clause 1, wherein a maximum width of the wheel system measured between a front of the leading wheel and a back of the trailing wheel is between 5.0 and 7.0 inches.

Clause 11: A wheel system comprising: a leading wheel having a first diameter and a first focus, a central wheel having a second diameter and a second focus, a trailing wheel having a third diameter and a third focus, a rotating arm, a leading axle, a central axle, a trailing axle, wherein: the first diameter greater than the second diameter; the second diameter is greater than the third diameter; the rotating arm comprises a leading end and a trailing end; the leading axle rotatably couples the leading wheel to the leading end of the rotating arm; the trailing axle rotatably couples the trailing wheel to the trailing end of the rotating arm; the central wheel is rotatably coupled about the central axle; the rotating arm is rotatably coupled about the central axle; the central axle is located between the leading end and the trailing end; the central wheel is located on a first side of the rotating arm; the leading wheel and the trailing wheel are located on a second side of the rotating arm, opposite the first side; the wheel system defines a contact plane tangent to the leading wheel, the central wheel, and the trailing wheel, the rotating arm defines a reference plane extending through the first focus, the second focus, and the third focus; the first focus comprises a first focus height, the second focus comprises a second focus height, and the third focus comprises a third focus height; the first focus height, the second focus height, and the third focus height are measured as perpendicular distances between the contact plane and the first focus, the second focus, and the third focus, respectively; the first focus height is between 1.75 inches and 2.25 inches; the second focus height is between 1.25 inches and 1.75 inches; and the third focus height is between 0.75 inches and 1.25 inches.

Clause 12: The wheel system of clause 11, wherein the leading wheel and the trailing wheel are offset from the rotating the arm by a distance between 0.40 inches and 0.65 inches.

Clause 13: The wheel system of clause 11, wherein the central wheel is offset from the rotating arm by a distance between 0.40 inches and 0.65 inches.

Clause 14: The wheel system of clause 11, wherein a maximum width of the wheel system measured between a front of the leading wheel and a back of the trailing wheel is between 5.0 and 7.0 inches.

Clause 15: A luggage bag comprising: a luggage body, a wheel well, a central axle, and a wheel system coupled to the luggage body by the central axle and housed within the wheel well; the wheel system comprising: a leading wheel having a first diameter and a first focus, a central wheel having a second diameter and a second focus, a trailing wheel having a third diameter and a third focus, a rotating arm, a leading axle, a trailing axle, wherein: the rotating arm is rotatably couple about the central axle; the central wheel is rotatably coupled about the central axle; the rotating arm comprises a leading end forward of the central axle and a trailing end rearward of the central axle; the leading axle rotatably couples the leading wheel to the leading end of the rotating arm; the trailing axle rotatably couples the trailing wheel to the trailing end of the rotating arm; the central wheel is located on a first side of the rotating arm; the leading wheel and the trailing wheel are located on a second side of the rotating arm, opposite the first side; the first diameter is greater than the second diameter; the second diameter is greater than the third diameter; the rotating arm defines a reference plane extending through the first focus, the second focus, and the third focus; the wheel system defines a contact plane tangent to the leading wheel, the central wheel, and the trailing wheel; the reference plane and the contact plane form an acute angle.

Clause 16: The luggage bag of clause 15, wherein the wheel system housed within the wheel well does not extend past a perimeter of the luggage body.

Clause 17: The luggage bag of clause 15, wherein the leading wheel and the trailing wheel are offset from the rotating the arm by a distance between 0.40 inches and 0.65 inches.

Clause 18: The luggage bag of clause 15, wherein the central wheel is offset from the rotating arm by a distance between 0.40 inches and 0.65 inches.

Clause 19: The luggage bag of clause 15, wherein the acute angle between the contact plane and the reference plane is between 10 degrees and 60 degrees.

Clause 20: The luggage bag of clause 19, wherein the acute angle between the contact plane and the reference plane is between 10 degrees and 30 degrees.

Clause 21: A wheel system comprising: a leading wheel having a first diameter and a first focus, a central wheel having a second diameter and a second focus, a trailing wheel having a third diameter and a third focus, a rotating arm, a leading axle, a trailing axle, wherein: the first diameter is greater than the second diameter; the second diameter is greater than the third diameter; the rotating arm comprises a leading end and a trailing end; the leading axle rotatably couples the leading wheel to the leading end of the rotating arm; the trailing axle rotatably couples the trailing wheel to the trailing end of the rotating arm; the central wheel is rotatably coupled about the central axle; the rotating arm is rotatably coupled about the central axle; the central axle is located between the leading end and the trailing end; the central wheel is located on a first side of the rotating arm; the leading wheel and the trailing wheel are located on a second side of the rotating arm, opposite the first side; the rotating arm defines a reference plane extending through the first focus, the second focus, and the third focus; the wheel system defines a contact plane tangent to the leading wheel, the central wheel, the trailing wheel; and the reference plane and the contact plane form an acute angle, the wheel system is configured to traverse an obstacle located on a ground plane; wherein: in a first configuration the contact plane is coincident with the ground plane; in a second configuration the leading wheel interacts with the obstacle such that the contact plane is not parallel to the ground plane, the leading wheel is below the ground plane, the central wheel is on the ground plane, and the trailing wheel is above the ground plane; in a third configuration the contact plane is coincident with the ground plane and only the leading wheel and trailing wheel support the weight of the wheel system; and in a fourth configuration the wheel system interacts with the obstacle such that the contact plane is not parallel to the ground plane, the leading wheel is above the ground plane, the central wheel is on the ground plane, and the trailing wheel is below the ground plane.

Clause 22: The wheel system of clause 21, wherein a maximum width of the wheel system measured between a front of the leading wheel and a back of the trailing wheel is between 5.0 and 7.0 inches.

Clause 23: The wheel system of clause 22, wherein a maximum height of the wheel system is defined by the first diameter, and wherein a ratio of the maximum height divided by the maximum width greater than 0.6.

Clause 24: The wheel system of clause 21, wherein the acute angle between the contact plane and the reference plane is between 10 degrees and 60 degrees.

Clause 25: The wheel system of clause 21, wherein the leading wheel and the trailing wheel are offset from the rotating the arm by a distance between 0.40 inches and 0.65 inches.

Clause 26: The wheel system of clause 21, wherein the central wheel is offset from the rotating arm by a distance between 0.40 inches and 0.65 inches.

Clause 27: The wheel system of clause 21, wherein the second diameter is between 60% and 90% of the first diameter; and wherein the third diameter is between 35% and 65% of the first diameter.

Clause 28: The wheel system of clause 21, further comprising a spacer located on at least one of the leading axle, the central axle, and the trailing axle, between the rotating arm and at least one of the leading wheel, the central wheel, and the trailing wheel.

Clause 29: The wheel system of clause 28, wherein the spacer comprises a spacer width between 0.4 inches and 0.6 inches.

Clause 30: The wheel system of clause 28, wherein the spacer is integrally formed with the rotating arm.

Clause 31: The wheel system of clause 21, wherein a maximum width of the wheel system measured between a front of the leading wheel and a back of the trailing wheel is between 5.0 and 7.0 inches.

Clause 32: A wheel system comprising: a leading wheel having a first diameter and a first focus, a central wheel having a second diameter and a second focus, a trailing wheel having a third diameter and a third focus, a rotating arm, a leading axle, a central axle, a trailing axle, wherein: the first diameter is greater than the second diameter; the second diameter is greater than the third diameter; the rotating arm comprises a leading end and a trailing end; the leading axle rotatably couples the leading wheel to the leading end of the rotating arm; the trailing axle rotatably couples the trailing wheel to the trailing end of the rotating arm; the central wheel is rotatably coupled about the central axle; the rotating arm is rotatably coupled about the central axle; the central axle is located between the leading end and the trailing end; the central wheel is located on a first side of the rotating arm; the leading wheel and the trailing wheel are located on a second side of the rotating arm, opposite the first side; the rotating arm defines a reference plane extending through the first focus, the second focus, and the third focus; the wheel system defines a contact plane tangent to the leading wheel, the central wheel, and the trailing wheel; the reference plane and the contact plane form an acute angle, the wheel system is configured to traverse an obstacle located on a ground plane; wherein in a first configuration the contact plane is coincident with the ground plane; in a second configuration only the leading wheel interacts with the obstacle such that the contact plane is not parallel to the ground plane, the central wheel is above the ground plane, and the rear wheel is on the ground plane; in a third configuration only the rear wheel interacts with the obstacle such that the contact plane is not parallel to the ground plane, the central wheel is above the ground plane, and the leading wheel is on the ground plane.

What is claimed is:

1. A wheel system comprising:
a leading wheel having a first diameter and a first focus,
a central wheel having a second diameter and a second focus,
a trailing wheel having a third diameter and a third focus,
a rotating arm,
a leading axle,
a central axle,
a trailing axle,
wherein:
the first diameter is greater than the second diameter;
the second diameter is greater than the third diameter;
the rotating arm comprises a leading end, a trailing end, and a central aperture located between the leading end and the trailing end,
wherein the central axle is received by the central aperture;
the leading axle rotatably couples the leading wheel to the leading end of the rotating arm;
the trailing axle rotatably couples the trailing wheel to the trailing end of the rotating arm;
the central wheel is rotatably coupled about the central axle;
the rotating arm is rotatably coupled about the central axle,
wherein the leading wheel and trailing wheel raise or lower as the rotating arm rotates;
the central axle is located between the leading end and the trailing end;
the central wheel is located on a first side of the rotating arm;
the leading wheel and the trailing wheel are located on a second side of the rotating arm, opposite the first side;
the rotating arm defines a reference plane extending through the first focus, the second focus, and the third focus;
the wheel system defines a contact plane tangent to the leading wheel, the central wheel, and the trailing wheel; and
the reference plane and the contact plane form an acute angle.

2. The wheel system of claim 1, wherein the acute angle between the contact plane and the reference plane is between 10 degrees and 60 degrees.

3. The wheel system of claim 2, wherein the acute angle between the contact plane and the reference plane is between 10 degrees and 30 degrees.

4. The wheel system of claim 1, wherein the leading wheel and the trailing wheel are offset from the rotating arm by a distance between 0.40 inches and 0.65 inches.

5. The wheel system of claim 1, wherein the central wheel is offset from the rotating arm by a distance between 0.40 inches and 0.65 inches.

6. The wheel system of claim 1, wherein the second diameter is between 60% and 90% of the first diameter; and wherein the third diameter is between 35% and 65% of the first diameter.

7. The wheel system of claim 1, further comprising a spacer located on at least one of the leading axle, the central axle, and the trailing axle, between the rotating arm and at least one of the leading wheel, the central wheel, and the trailing wheel.

8. The wheel system of claim 7, wherein the spacer comprises a spacer width between 0.4 inches and 0.6 inches.

9. The wheel system of claim 7, wherein the spacer is integrally formed with the rotating arm.

10. The wheel system of claim 1, wherein a maximum width of the wheel system measured between a front of the leading wheel and a back of the trailing wheel is between 5.0 and 7.0 inches.

11. A wheel system comprising:
a leading wheel having a first diameter and a first focus,
a central wheel having a second diameter and a second focus,
a trailing wheel having a third diameter and a third focus,
a rotating arm,
a leading axle,
a central axle,
a trailing axle,
wherein:
the first diameter greater than the second diameter;
the second diameter is greater than the third diameter;
the rotating arm comprises a leading end, a trailing end, and a central aperture located between the leading end and the trailing end,
wherein the central axle is received by the central aperture;
the leading axle rotatably couples the leading wheel to the leading end of the rotating arm;
the trailing axle rotatably couples the trailing wheel to the trailing end of the rotating arm;
the central wheel is rotatably coupled about the central axle;
the rotating arm is rotatably coupled about the central axle,
wherein the leading wheel and trailing wheel raise or lower as the rotating arm rotates;
the central axle is located between the leading end and the trailing end;
the central wheel is located on a first side of the rotating arm;
the leading wheel and the trailing wheel are located on a second side of the rotating arm, opposite the first side;
the wheel system defines a contact plane tangent to the leading wheel, the central wheel, and the trailing wheel;
the rotating arm defines a reference plane extending through the first focus, the second focus, and the third focus;

the first focus comprises a first focus height, the second focus comprises a second focus height, and the third focus comprises a third focus height;

the first focus height, the second focus height, and the third focus height are measured as perpendicular distances between the contact plane and the first focus, the second focus, and the third focus, respectively;

the first focus height is between 1.75 inches and 2.25 inches;

the second focus height is between 1.25 inches and 1.75 inches; and the third focus height is between 0.75 inches and 1.25 inches.

12. The wheel system of claim 11, wherein the leading wheel and the trailing wheel are offset from the rotating the arm by a distance between 0.40 inches and 0.65 inches.

13. The wheel system of claim 11, wherein the central wheel is offset from the rotating arm by a distance between 0.40 inches and 0.65 inches.

14. The wheel system of claim 11, wherein a maximum width of the wheel system measured between a front of the leading wheel and a back of the trailing wheel is between 5.0 and 7.0 inches.

15. A luggage bag comprising:
a luggage body, a wheel well, a central axle, and a wheel system coupled to the luggage body by the central axle and housed within the wheel well;
the wheel system comprising:
a leading wheel having a first diameter and a first focus,
a central wheel having a second diameter and a second focus,
a trailing wheel having a third diameter and a third focus,
a rotating arm,
a leading axle,
a trailing axle,
wherein:
the rotating arm is rotatably coupled about the central axle,
wherein the leading wheel and trailing wheel raise or lower as the rotating arm rotates;
the central wheel is rotatably coupled about the central axle;
the rotating arm comprises a leading end forward of the central axle, and a trailing end rearward of the central axle, and a central aperture located between the leading end and the trailing end,
wherein the central axle is received by the central aperture;
the leading axle rotatably couples the leading wheel to the leading end of the rotating arm;
the trailing axle rotatably couples the trailing wheel to the trailing end of the rotating arm;
the central wheel is located on a first side of the rotating arm;
the leading wheel and the trailing wheel are located on a second side of the rotating arm, opposite the first side;
the first diameter is greater than the second diameter;
the second diameter is greater than the third diameter;
the rotating arm defines a reference plane extending through the first focus, the second focus, and the third focus;
the wheel system defines a contact plane tangent to the leading wheel, the central wheel, and the trailing wheel;
the reference plane and the contact plane form an acute angle.

16. The luggage bag of claim 15, wherein the wheel system housed within the wheel well does not extend past a perimeter of the luggage body.

17. The luggage bag of claim 15, wherein the leading wheel and the trailing wheel are offset from the rotating the arm by a distance between 0.40 inches and 0.65 inches.

18. The luggage bag of claim 15, wherein the central wheel is offset from the rotating arm by a distance between 0.40 inches and 0.65 inches.

19. The luggage bag of claim 15, wherein the acute angle between the contact plane and the reference plane is between 10 degrees and 60 degrees.

20. The luggage bag of claim 19, wherein the acute angle between the contact plane and the reference plane is between 10 degrees and 30 degrees.

* * * * *